US012574446B2

(12) United States Patent
Guim Bernat et al.

(10) Patent No.: US 12,574,446 B2
(45) Date of Patent: Mar. 10, 2026

(54) APPARATUS AND METHOD TO PERFORM SYNCHRONIZATION SERVICES IN A SWITCH

(71) Applicant: Intel Corporation, Santa Clara, CA (US)

(72) Inventors: Francesc Guim Bernat, Barcelona (ES); Kshitij A. Doshi, Tempe, AZ (US); Ned Smith, Beaverton, OR (US); Satish C. Jha, Portland, OR (US); Vesh Raj Sharma Banjade, Portland, OR (US); S M Iftekharul Alam, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 715 days.

(21) Appl. No.: 17/873,618

(22) Filed: Jul. 26, 2022

(65) Prior Publication Data

US 2022/0360646 A1     Nov. 10, 2022

(51) Int. Cl.
| | |
|---|---|
| *H04L 67/60* | (2022.01) |
| *H04L 49/20* | (2022.01) |
| *H04L 67/10* | (2022.01) |

(52) U.S. Cl.
CPC .............. *H04L 67/60* (2022.05); *H04L 49/20* (2013.01); *H04L 67/10* (2013.01)

(58) Field of Classification Search
CPC ......... H04L 67/60; H04L 49/20; H04L 67/10; H04L 67/1097
See application file for complete search history.

(56) References Cited

U.S. PATENT DOCUMENTS

| | | | | |
|---|---|---|---|---|
| 8,752,057 | B1 * | 6/2014 | Gould | G06F 9/52 |
| | | | | 718/102 |
| 10,320,710 | B2 | 6/2019 | Bernat et al. | |
| 10,474,664 | B2 * | 11/2019 | Bhargava | G06F 16/2308 |
| 11,563,800 | B1 * | 1/2023 | Trendafilov | H04L 47/82 |
| 2008/0005741 | A1 * | 1/2008 | Terrell | G06F 9/526 |
| | | | | 718/102 |
| 2013/0055284 | A1 * | 2/2013 | Sabato | G06F 9/526 |
| | | | | 718/106 |
| 2015/0205646 | A1 * | 7/2015 | Singh | G06F 9/526 |
| | | | | 718/106 |
| 2018/0217878 | A1 * | 8/2018 | Loh | G06F 9/526 |
| 2022/0035685 | A1 * | 2/2022 | Ghosh | G06F 11/3495 |
| 2022/0156084 | A1 * | 5/2022 | Hui | G06F 9/3851 |

OTHER PUBLICATIONS

"In-Band Network Telemetry (INT) Dataplane Specification" Version 2.1, The P4.org Applications Working Group, Contributions from Alibaba, Arista, CableLabs, Cisco Systems, Dell, Intel, Marvell, Netronome, VMware, Nov. 11, 2020, 56 pages.
Yu, Zhoulong et al, "NetLock: Fast, Centralized Lock Management Using Programmable Switches", SIGCOMM '20. Aug. 10-14, 2020, Virtual Event, NY, USA, 13 pages.

* cited by examiner

*Primary Examiner* — Cheikh T Ndiaye
(74) *Attorney, Agent, or Firm* — Essential Patents Group, LLP; Christopher K. Gagne

(57) ABSTRACT

Switching architectures to manage mutex primitives used to control access to objects or data blocks that are being processed by two or more microservices in a data center are provided.

21 Claims, 17 Drawing Sheets

APPARATUS AND METHOD TO PERFORM SYNCHRONIZATION SERVICES IN A SWITCH

BACKGROUND

Cloud computing provides access to servers, storage, databases, and a broad set of application services over the Internet. A cloud service provider offers cloud services such as network services and business applications that are hosted in servers in one or more data centers that can be accessed by companies or individuals over the Internet. Hyperscale cloud-service providers typically have hundreds of thousands of servers. Each server in a hyperscale cloud includes storage devices to store user data, for example, user data for business intelligence, data mining, analytics, social media and microservices. The cloud service provider generates revenue from companies and individuals (also referred to as tenants) that use the cloud services.

Disaggregated computing or Composable Disaggregated Infrastructure (CDI) is an emerging technology that makes use of high bandwidth, low-latency interconnects to aggregate compute, storage, memory, and networking fabric resources into shared resource pools that can be provisioned on demand.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
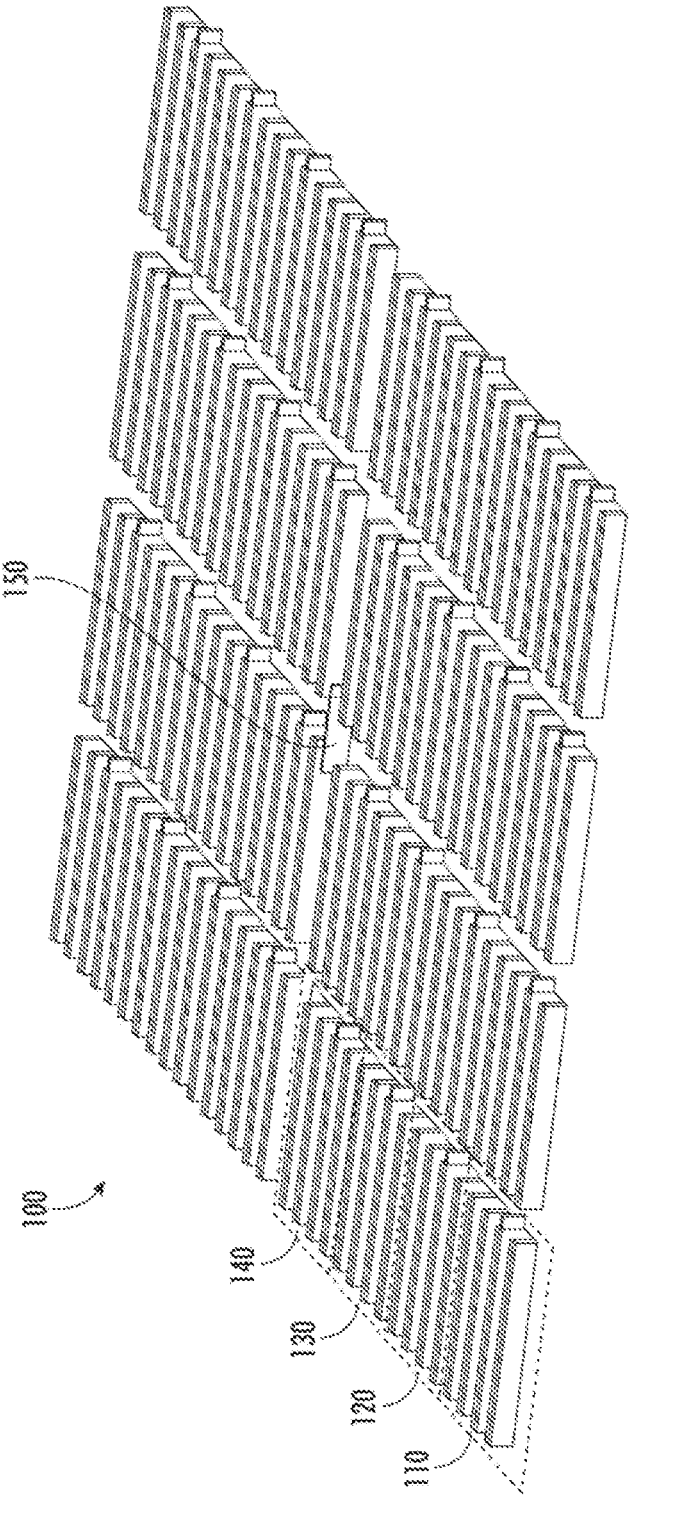
FIG. 1 is a simplified diagram of at least one embodiment of a data center for executing workloads with disaggregated resources.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

High speed networks are essential for supporting business, providing communication, and delivering entertainment. To increase network speed, Cloud service providers (CSPs) are evolving their hardware platforms by offering central processing units (CPUs), general purpose graphics processing units (GPGPUs), custom XPUs, and pooled storage and memory (for example, DDR, persistent memory, 3D XPoint, Optane, or memory devices that use chalcogenide glass). CSPs are vertically integrating these with custom orchestration control planes to expose these as services to users.

Growth in cloud native, scale out in applications, emergence of Compute Express Link (CXL) based protocols to stitch together systems and resources across multiple platforms, and increased and enhanced usages and capabilities offered by XPUs (for example, GPUs and Infrastructure Processing Units (IPUs)) have led a shift from core and CPU focused computing, to computing that spans multiple platforms and even multiple datacenters at times.

An application can be composed of microservices, where each microservice runs in its own process and communicates using protocols (e.g., application program interface (API), a Hypertext Transfer Protocol (HTTP) resource API, message service, remote procedure calls (RPC), or Google RPC (gRPC)). Microservices can be independently deployed using centralized management of these services.

Microservices share objects or data blocks that are accessed and modified concurrently. With new data center technologies such as pooled memories, the modification and access of objects or data blocks can occur in remote memories or storage where no coherency or consistency is provided.

Switching architectures to manage mutex primitives used to control access to objects or data blocks that are being processed by two or more microservices in the data center are provided Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 depicts a data center 100 in which disaggregated resources may cooperatively execute one or more workloads (e.g., applications on behalf of customers) that includes multiple systems 110, 120, 130, 140, a system being or including one or more rows of racks or trays. Of course, although data center 100 is shown with multiple systems, in some embodiments, the data center 100 may be embodied as a single system. As described in more detail herein, each rack houses multiple nodes, some of which may be equipped with one or more types of resources (e.g., memory devices, data storage devices, accelerator devices, general purpose processors, GPUs, xPUs, CPUs, field programmable gate arrays (FPGAs), or application-specific integrated circuits (ASICs)). Resources can be logically coupled or aggregated to form a composed node, which can act as, for example, a server to perform a job, workload or microservices.

Various examples described herein can perform an application composed of microservices, where each microservice runs in its own process and communicates using protocols (e.g., application program interface (API), a Hypertext Transfer Protocol (HTTP) resource API, message service, remote procedure calls (RPC), or Google RPC (gRPC)). Microservices can be independently deployed using centralized management of these services. The management system may be written in different programming languages and use different data storage technologies. A microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery. One or more microservices can execute on or use any resources described herein, such as resources of FIGS. 3-11.

In the illustrative embodiment, the nodes in each system 110, 120, 130, 140 are connected to multiple system switches (e.g., switches that route data communications to and from nodes within the system). Switches can be positioned at the top of rack (TOR), end of row (EOR), middle of rack (MOR), or other. The system switches, in turn, connect with spine switches 150 that switch communications among systems (e.g., the systems 110, 120, 130, 140) in the data center 100. In some embodiments, the nodes may be connected with a fabric using standards described herein or proprietary standards. In other embodiments, the nodes may be connected with other fabrics, such as InfiniBand or Ethernet or optical. As described in more detail herein, resources within nodes in the data center 100 may be allocated to a group (referred to herein as a "managed node") containing resources from one or more nodes to be collectively utilized in the execution of a workload. The workload can execute as if the resources belonging to the managed node were located on the same node. The resources in a managed node may belong to nodes belonging to different racks, and even to different systems 110, 120, 130, 140. As such, some resources of a single node may be allocated to one managed node while other resources of the same node are allocated to a different managed node (e.g., one processor assigned to one managed node and another processor of the same node assigned to a different managed node).

The disaggregation of resources to nodes comprised predominantly of a single type of resource (e.g., compute nodes comprising primarily compute resources, memory nodes containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources. For example, because nodes predominantly contain resources of a particular type, resources of a given type can be upgraded independently of other resources. Additionally, because different resource types (processors, memory, storage, accelerators, etc.) typically have different refresh rates, greater resource utilization, and reduced total cost of ownership may be achieved. For example, a data center operator can upgrade the processors throughout their facility by only swapping out the compute nodes. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
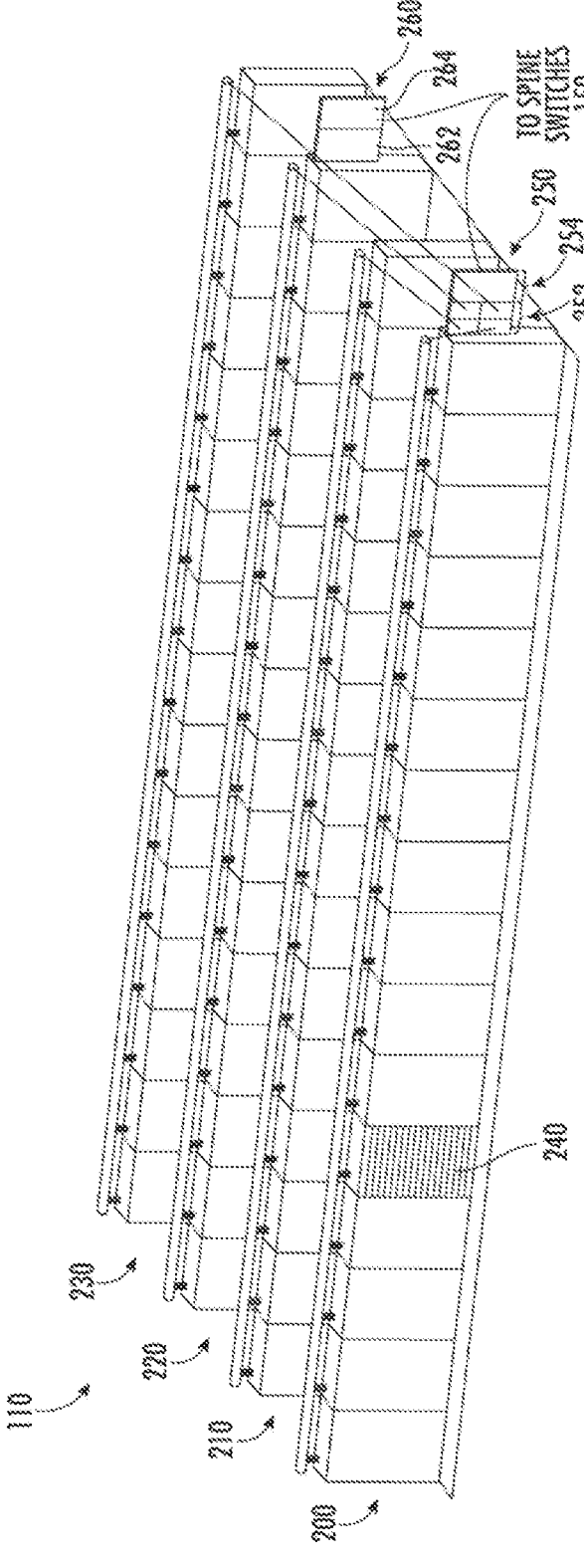
FIG. 2 is a simplified diagram of at least one embodiment of a system that may be included in a data center.

FIG. 2 depicts a system 110. A system 110 can include a set of rows 200, 210, 220, 230 of racks 240. Each rack 240 may house multiple nodes (e.g., sixteen nodes) and provide power and data connections to the housed nodes, as described in more detail herein. In the illustrative embodiment, the racks in each row 200, 210, 220, 230 are connected to multiple system switches 250, 260. The system switch 250 includes a set of ports 252 to which the nodes of the racks of the system 110 are connected and another set of ports 254 that connect the system 110 to the spine switches 150 to provide connectivity to other systems in the data center 100. Similarly, the system switch 260 includes a set of ports 262 to which the nodes of the racks of the system 110 are connected and a set of ports 264 that connect the system 110 to the spine switches 150. As such, the use of the pair of switches 250, 260 provides an amount of redundancy to the system 110. For example, if either of the switches 250, 260 fails, the nodes in the system 110 may still maintain data communication with the remainder of the data center 100 (e.g., nodes of other systems) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express or Compute Express Link) via optical signaling media of an optical fabric.

It should be appreciated that each of the other systems 120, 130, 140 (as well as additional systems of the data center 100) may be similarly structured as, and have components similar to, the system 110 shown in and described in regard to FIG. 2 (e.g., each system may have rows of racks housing multiple nodes as described above). Additionally, while two system switches 250, 260 are shown, it should be understood that in other embodiments, each system 110, 120, 130, 140 may be connected to a different number of system switches, providing even more failover capacity. Of course, in other embodiments, systems may be arranged differently than the rows-of-racks configuration shown in FIGS. 1-2. For example, a system may be embodied as multiple sets of racks in which each set of racks is arranged radially, e.g., the racks are equidistant from a center switch.

Figure 3:
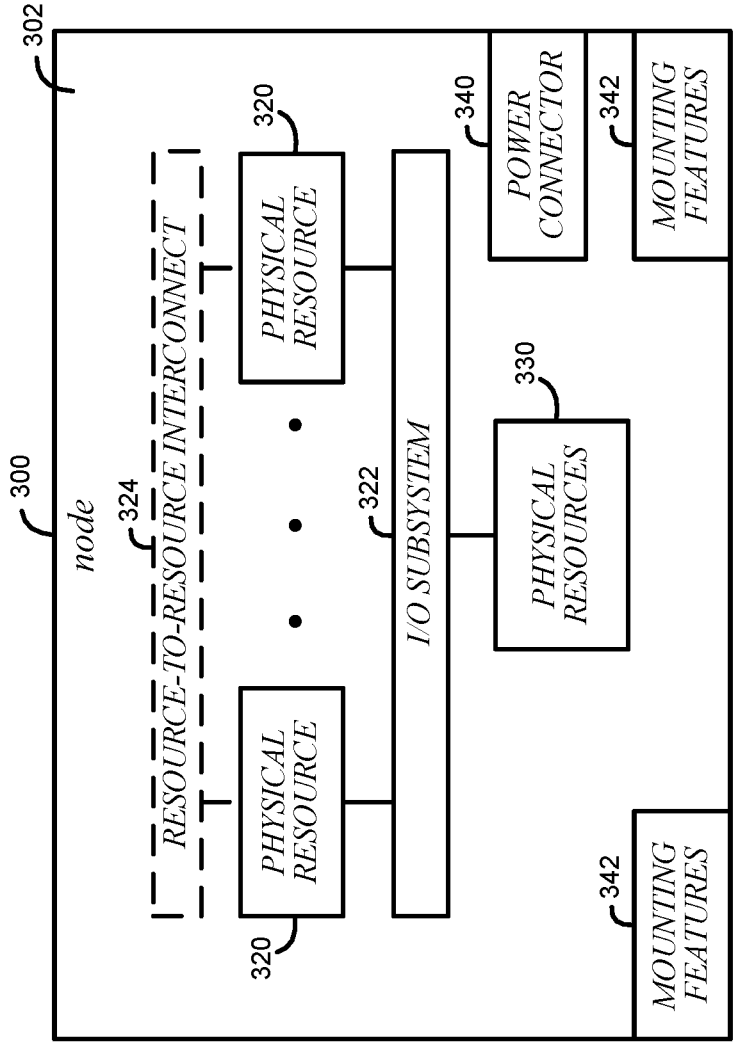
FIG. 3 is a simplified block diagram of at least one embodiment of a top side of a node.

Referring now to FIG. 3, node 300, in the illustrative embodiment, is configured to be mounted in a corresponding rack 240 of the data center 100 as discussed above. In some embodiments, each node 300 may be optimized or otherwise configured for performing particular tasks, such as compute tasks, acceleration tasks, data storage tasks, etc. For example, the node 300 may be embodied as a compute node 500 as discussed below in regard to FIG. 5, an accelerator node 600 as discussed below in regard to FIG. 6, a storage node 700 as discussed below in regard to FIG. 7, or as a node optimized or otherwise configured to perform other specialized tasks, such as a memory node 800, discussed below in regard to FIG. 8. For example, one or more microservices can execute on or using node 300, node 500, accelerator node 600, storage node 700, and/or memory node 800.

Although two physical resources 320 are shown in FIG. 3, it should be appreciated that the node 300 may include one, two, or more physical resources 320 in other embodiments. The physical resources 320 may be embodied as any type of processor, controller, or other compute circuit capable of performing various tasks such as compute functions and/or controlling the functions of the node 300 depending on, for example, the type or intended functionality of the node 300. For example, as discussed in more detail below, the physical resources 320 may be embodied as high-performance processors in embodiments in which the node 300 is embodied as a compute node, as accelerator co-processors or circuits in embodiments in which the node 300 is embodied as an accelerator node, storage controllers in embodiments in which the node 300 is embodied as a storage node, or a set of memory devices in embodiments in which the node 300 is embodied as a memory node.

The node 300 also includes one or more additional physical resources 330 mounted to circuit board substrate 302. In the illustrative embodiment, the additional physical resources include a network interface controller (NIC) as discussed in more detail below. Of course, depending on the type and functionality of the node 300, the physical resources 330 may include additional or other electrical components, circuits, and/or devices in other embodiments.

The physical resources 320 can be communicatively coupled to the physical resources 330 via an Input/Output (I/O) subsystem 322. The I/O subsystem 322 may be embodied as circuitry and/or components to facilitate Input/Output operations with the physical resources 320, the physical resources 330, and/or other components of the node 300. For example, the I/O subsystem 322 may be embodied as, or otherwise include, memory controller hubs, Input/Output control hubs, integrated sensor hubs, firmware devices, communication links (e.g., point-to-point links, bus links, wires, cables, waveguides, light guides, printed circuit board traces, etc.), and/or other components and subsystems to facilitate the Input/Output operations. In the illustrative embodiment for memory system, the I/O subsystem 322 is embodied as, or otherwise includes, a double data rate 4 (DDR4) data bus or a DDR5 data bus.

In some embodiments, the node 300 may also include a resource-to-resource interconnect 324. The resource-to-resource interconnect 324 may be embodied as any type of communication interconnect capable of facilitating resource-to-resource communications. In the illustrative embodiment, the resource-to-resource interconnect 324 is embodied as a high-speed point-to-point interconnect (e.g., faster than the I/O subsystem 322). For example, the resource-to-resource interconnect 324 may be embodied as a QuickPath Interconnect (QPI), an UltraPath Interconnect (UPI), PCI express (PCIe), or other high-speed point-to-point interconnect utilized for resource-to-resource communications.

The node 300 also includes a power connector 340 configured to mate with a corresponding power connector of the rack 240 when the node 300 is mounted in the corresponding rack 240. The node 300 receives power from a power supply of the rack 240 via the power connector 340 to supply power to the various electrical components of the node 300. In some examples, the node 300 includes local power supply (e.g., an on-board power supply) to provide power to the electrical components of the node 300. In some examples, the node 300 does not include any local power supply (e.g., an on-board power supply) to provide power to the electrical components of the node 300. The exclusion of a local or on-board power supply facilitates the reduction in the overall footprint of the circuit board substrate 302, which may increase the thermal cooling characteristics of the various electrical components mounted on the circuit board substrate 302 as discussed above. In some embodiments, voltage regulators are placed on circuit board substrate 302 directly opposite of the processors 520 (see FIG. 5), and power is routed from the voltage regulators to the processors 520 by vias extending through the circuit board substrate 302. Such a configuration provides an increased thermal budget, additional current and/or voltage, and better voltage control relative to typical printed circuit boards in which processor power is delivered from a voltage regulator, in part, by printed circuit traces.

In some embodiments, the node 300 may also include mounting features 342 configured to mate with a mounting arm, or other structure, of a robot to facilitate the placement of the node 300 in a rack 240 by the robot. The mounting features 342 may be embodied as any type of physical structures that allow the robot to grasp the node 300 without damaging the circuit board substrate 302 or the electrical components mounted thereto. For example, in some embodiments, the mounting features 342 may be embodied as non-conductive pads attached to the circuit board substrate 302. In other embodiments, the mounting features may be embodied as brackets, braces, or other similar structures attached to the circuit board substrate 302. The particular number, shape, size, and/or make-up of the mounting feature 342 may depend on the design of the robot configured to manage the node 300.

Figure 4:
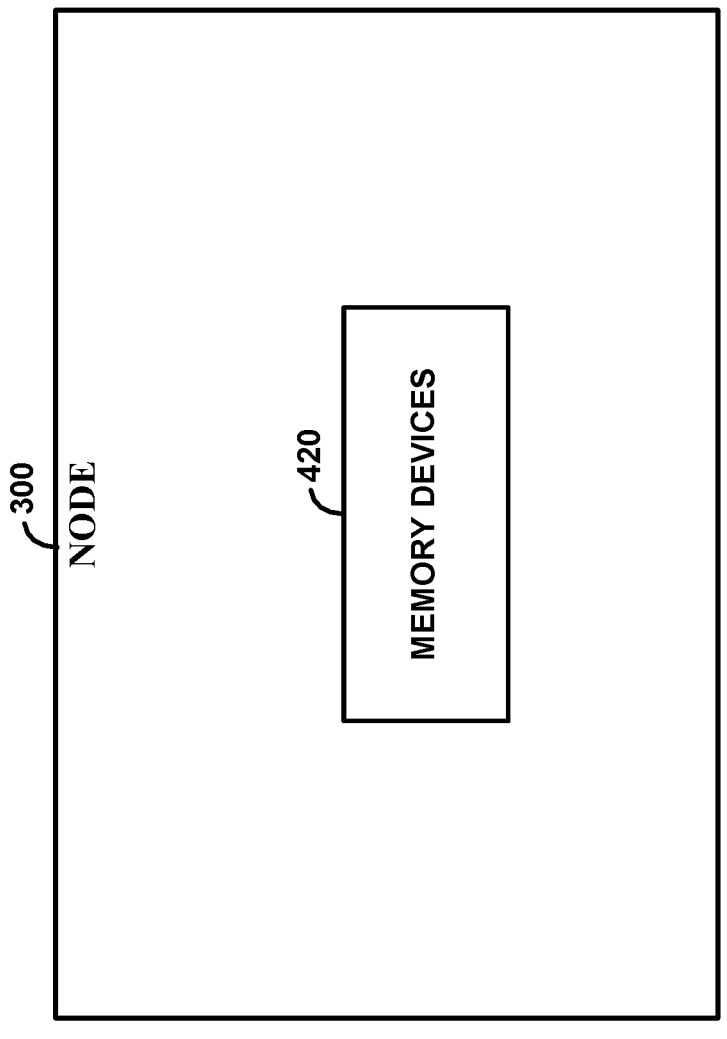
FIG. 4 is a simplified block diagram of at least one embodiment of a bottom side of a node.

Referring now to FIG. 4, in addition to the physical resources 330 mounted on circuit board substrate 302, the node 300 also includes one or more memory devices 420. The physical resources 320 can be communicatively coupled to memory devices 420 via the I/O subsystem 322. For example, the physical resources 320 and the memory devices 420 may be communicatively coupled by one or more vias extending through the circuit board substrate 302. A physical resource 320 may be communicatively coupled to a different set of one or more memory devices 420 in some embodiments. Alternatively, in other embodiments, each physical resource 320 may be communicatively coupled to each memory device 420.

The memory devices 420 may be embodied as any type of memory device capable of storing data for the physical resources 320 during operation of the node 300, such as any type of volatile (e.g., dynamic random access memory (DRAM), etc.) or nonvolatile memory.

In one embodiment, the memory device is a block addressable memory device, such as those based on NAND or NOR technologies, for example, multi-threshold level NAND flash memory and NOR flash memory. A block can be any size such as but not limited to 2 KB, 4 KB, 5 KB, and so forth. A memory device may also include next-generation nonvolatile devices, such as Intel Optane® memory or other byte addressable write-in-place nonvolatile memory devices (e.g., memory devices that use chalcogenide glass), multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 5:
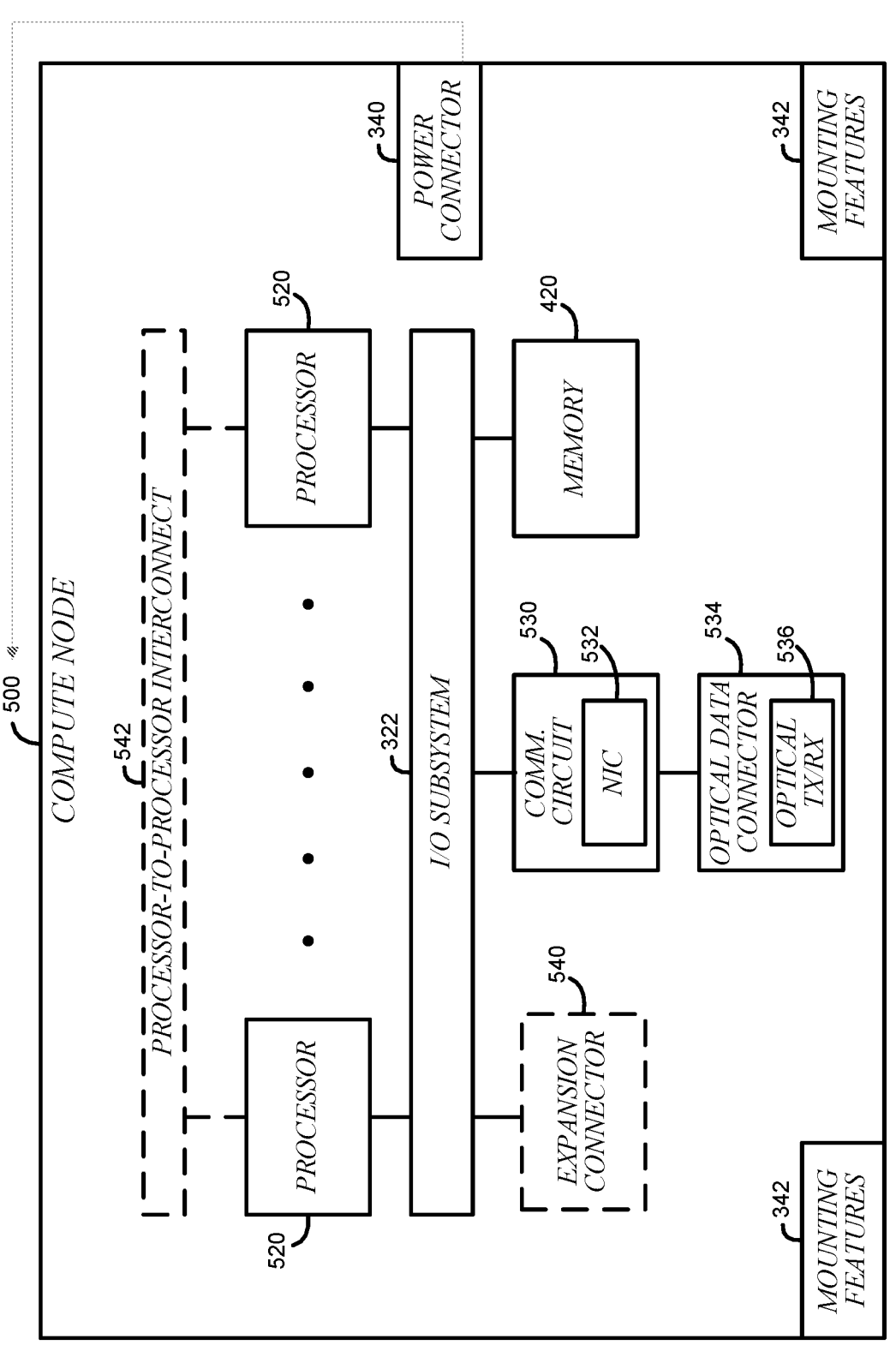
FIG. 5 is a simplified block diagram of at least one embodiment of a compute node.

Referring now to FIG. 5, in some embodiments, the node 300 may be embodied as a compute node 500. The compute node 500 can be configured to perform compute tasks. Of course, as discussed above, the compute node 500 may rely on other nodes, such as acceleration nodes and/or storage nodes, to perform compute tasks. In the illustrative compute node 500, the physical resources 320 are embodied as processors 520. Although only two processors 520 are shown in FIG. 5, it should be appreciated that the compute node 500 may include additional processors 520 in other embodiments. Illustratively, the processors 520 are embodied as high-performance processors 520 and may be configured to operate at a relatively high power rating.

In some embodiments, the compute node 500 may also include a processor-to-processor interconnect 542. Processor-to-processor interconnect 542 may be embodied as any type of communication interconnect capable of facilitating processor-to-processor interconnect 542 communications. In the illustrative embodiment, the processor-to-processor interconnect 542 is embodied as a high-speed point-to-point interconnect (e.g., faster than the I/O subsystem 322). For example, the processor-to-processor interconnect 542 may be embodied as a QuickPath Interconnect (QPI), an Ultra-Path Interconnect (UPI), or other high-speed point-to-point interconnect utilized for processor-to-processor communications (e.g., PCIe or CXL).

The compute node 500 also includes a communication circuit 530. The illustrative communication circuit 530 includes a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the compute node 500 to connect with another compute device (e.g., with other nodes 300). In some embodiments, the NIC 532 may be embodied as part of a system-on-a-chip (SoC) that includes one or more processors, or included on a multichip package that also contains one or more processors. In some embodiments, the NIC 532 may include a local processor (not shown) and/or a local memory (not shown) that are both local to the NIC 532. In such embodiments, the local processor of the NIC 532 may be capable of performing one or more of the functions of the processors 520. Additionally or alternatively, in such embodiments, the local memory of the NIC 532 may be integrated into one or more components of the compute node 500 at the board level, socket level, chip level, and/or other levels. In some examples, a network interface includes a network interface controller or a network interface card. In some examples, a network interface can include one or more of a network interface controller (NIC) 532, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

Some examples of a NIC 532 are part of an Infrastructure Processing Unit (IPU) or data processing unit (DPU) or utilized by an IPU or DPU. An IPU or DPU can include a network interface, memory devices, and one or more programmable or fixed function processors (e.g., CPU or XPU) to perform offload of operations that could have been performed by a host CPU or XPU or remote CPU or XPU. In some examples, the IPU or DPU can perform virtual switch operations, manage storage transactions (e.g., compression, cryptography, virtualization), and manage operations performed on other IPUs, DPUs, servers, or devices.

The communication circuit 530 is communicatively coupled to an optical data connector 534. The optical data connector 534 is configured to mate with a corresponding optical data connector of a rack when the compute node 500 is mounted in the rack. Illustratively, the optical data connector 534 includes a plurality of optical fibers which lead from a mating surface of the optical data connector 534 to an optical transceiver 536. The optical transceiver 536 is configured to convert incoming optical signals from the rack-side optical data connector to electrical signals and to convert electrical signals to outgoing optical signals to the rack-side optical data connector. Although shown as forming part of the optical data connector 534 in the illustrative embodiment, the optical transceiver 536 may form a portion of the communication circuit 530 in other embodiments.

In some embodiments, the compute node 500 may also include an expansion connector 540. In such embodiments, the expansion connector 540 is configured to mate with a corresponding connector of an expansion circuit board substrate to provide additional physical resources to the compute node 500. The additional physical resources may be used, for example, by the processors 520 during operation of the compute node 500. The expansion circuit board substrate may be substantially similar to the circuit board substrate 302 discussed above and may include various electrical components mounted thereto. The particular electrical components mounted to the expansion circuit board substrate may depend on the intended functionality of the expansion circuit board substrate. For example, the expansion circuit board substrate may provide additional compute resources, memory resources, and/or storage resources. As such, the additional physical resources of the expansion circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits. Note that reference to GPU or CPU herein can in addition or alternatively refer to an XPU or xPU. An xPU can include one or more of: a GPU, ASIC, FPGA, or accelerator device.

Figure 6:
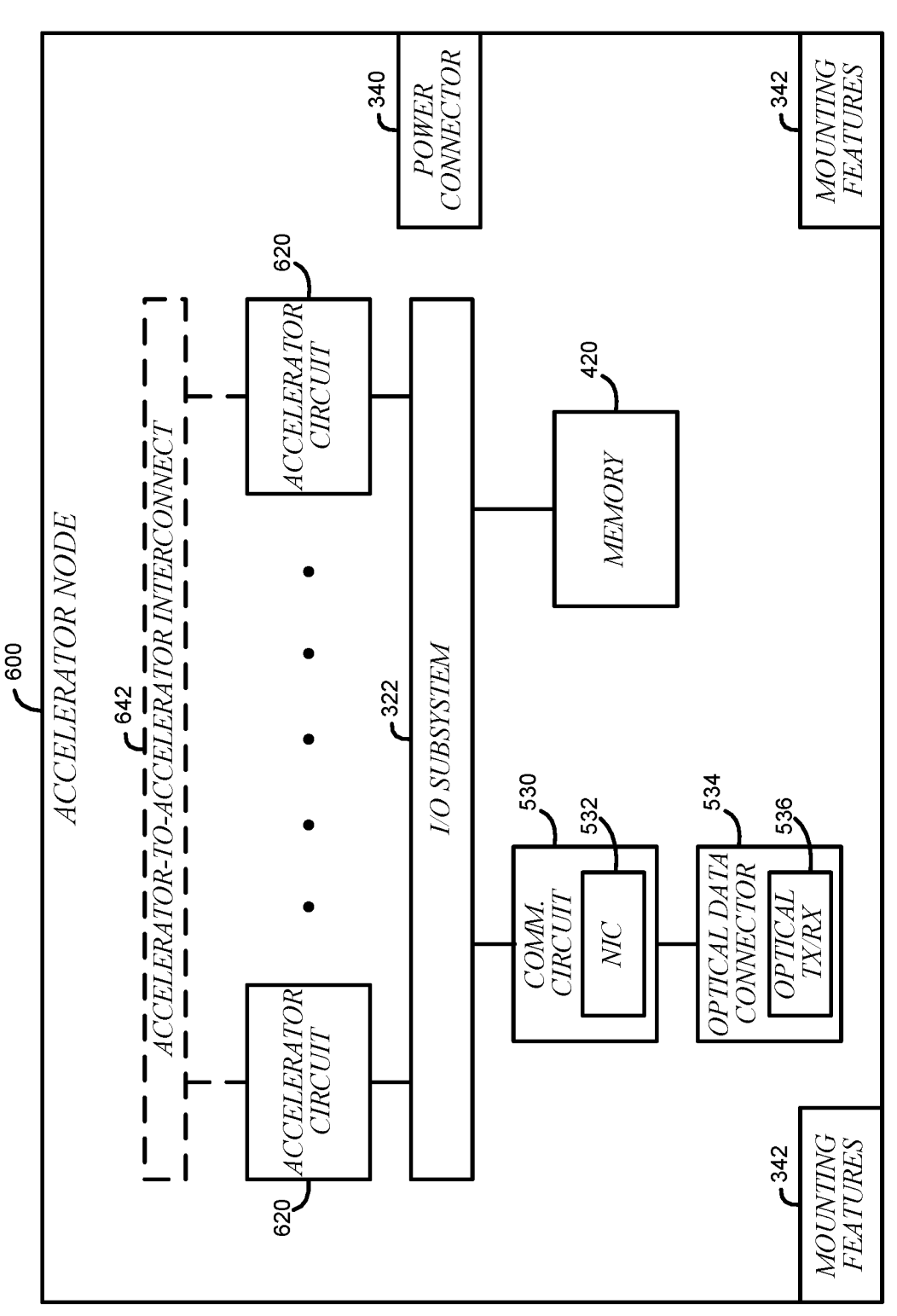
FIG. 6 is a simplified block diagram of at least one embodiment of an accelerator node usable in a data center.

Referring now to FIG. 6, in some embodiments, the node 300 may be embodied as an accelerator node 600. The accelerator node 600 is configured to perform specialized compute tasks, such as machine learning, encryption, hashing, or another computational-intensive task. In some embodiments, for example, a compute node 500 may offload tasks to the accelerator node 600 during operation. The accelerator node 600 includes various components similar to components of the node 300 and/or compute node 500, which have been identified in FIG. 6 using the same reference numbers.

In the illustrative accelerator node 600, the physical resources 320 are embodied as accelerator circuits 620. Although only two accelerator circuits 620 are shown in FIG. 6, it should be appreciated that the accelerator node 600 may include additional accelerator circuits 620 in other embodiments. The accelerator circuits 620 may be embodied as any type of processor, co-processor, compute circuit, or other device capable of performing compute or processing operations. For example, the accelerator circuits 620 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, programmable processing pipeline (e.g., programmable by P4, C, Python, Broadcom Network Programming Language (NPL), or x86 compatible executable binaries or other executable binaries). Processors, FPGAs, other specialized processors, controllers, devices, and/or circuits can be used utilized for packet processing or packet modification. Ternary content-addressable memory (TCAM) can be used for parallel match-action or look-up operations on packet header content.

In some embodiments, the accelerator node 600 may also include an accelerator-to-accelerator interconnect 642. Similar to the resource-to-resource interconnect 324 of the node 300 discussed above, the accelerator-to-accelerator interconnect 642 may be embodied as any type of communication interconnect capable of facilitating accelerator-to-accelerator communications. In the illustrative embodiment, the accelerator-to-accelerator interconnect 642 is embodied as a high-speed point-to-point interconnect (e.g., faster than the I/O subsystem 322). For example, the accelerator-to-accelerator interconnect 642 may be embodied as a QuickPath Interconnect (QPI), an UltraPath Interconnect (UPI), or other high-speed point-to-point interconnect utilized for accelerator-to-accelerator communications. In some embodiments, the accelerator circuits 620 may be daisy-chained with a primary accelerator circuit 620 connected to the NIC 532 and memory 420 through the I/O subsystem 322 and a secondary accelerator circuit 620 connected to the NIC 532 and memory 420 through a primary accelerator circuit 620.

Figure 7:
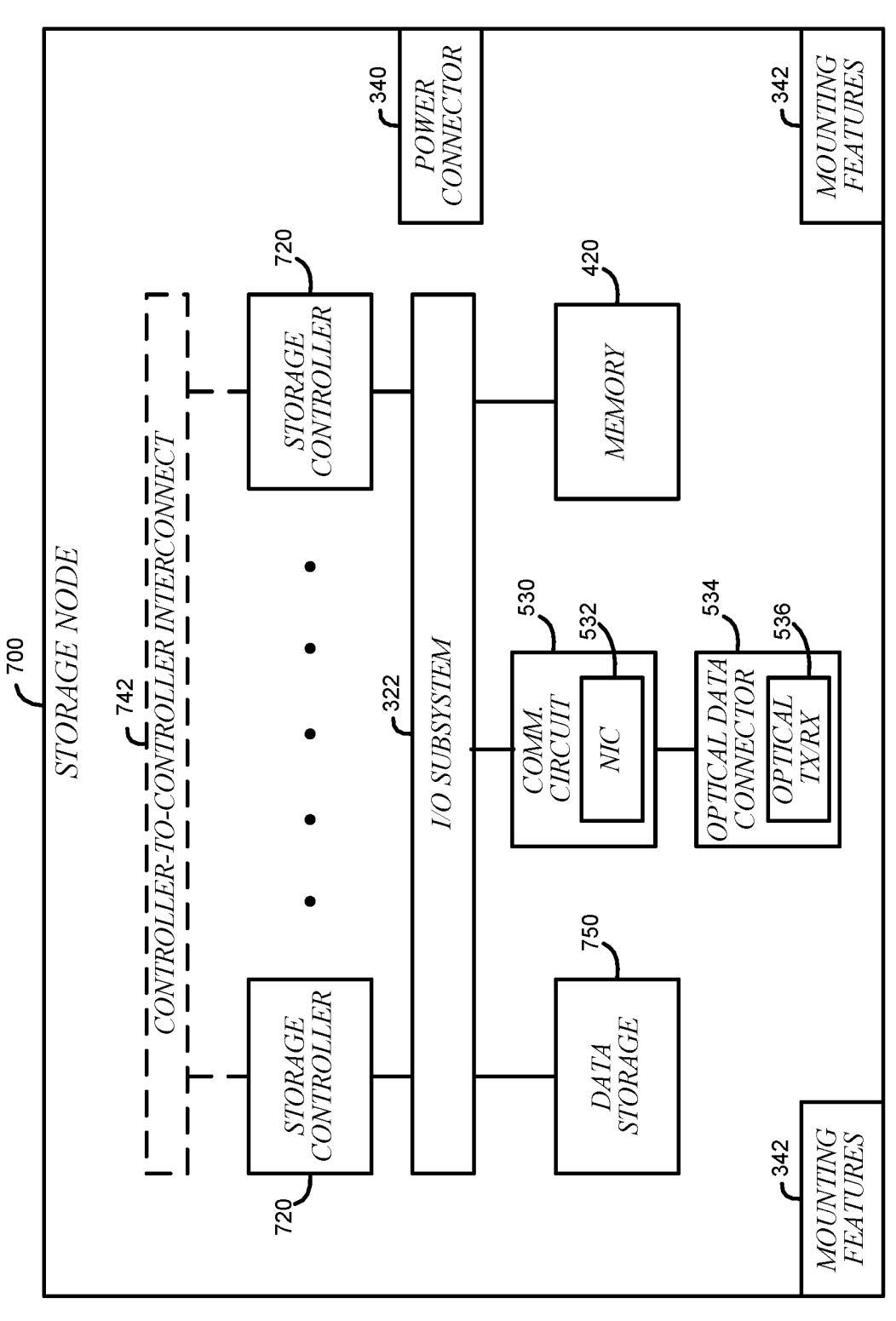
FIG. 7 is a simplified block diagram of at least one embodiment of a storage node usable in a data center.

Referring now to FIG. 7, in some embodiments, the node 300 may be embodied as a storage node 700. The storage node 700 is configured in some embodiments to store data in a data storage 750 local to the storage node 700. For example, during operation, a compute node 500 or an accelerator node 600 may store and retrieve data from the data storage 750 of the storage node 700. The storage node 700 includes various components similar to components of the node 300 and/or the compute node 500, which have been identified in FIG. 7 using the same reference numbers.

In the illustrative storage node 700, the physical resources 320 are embodied as storage controllers 720. Although only two storage controllers 720 are shown in FIG. 7, it should be appreciated that the storage node 700 may include additional storage controllers 720 in other embodiments. The storage controllers 720 may be embodied as any type of processor, controller, or control circuit capable of controlling the storage and retrieval of data into/from the data storage 750 based on requests received via the communication circuit 530 or other components. In the illustrative embodiment, the storage controllers 720 are embodied as relatively low-power processors or controllers.

In some embodiments, the storage node 700 may also include a controller-to-controller interconnect 742. Similar to the resource-to-resource interconnect 324 of the node 300 discussed above, the controller-to-controller interconnect 742 may be embodied as any type of communication interconnect capable of facilitating controller-to-controller communications. In the illustrative embodiment, the controller-to-controller interconnect 742 is embodied as a high-speed point-to-point interconnect (e.g., faster than the I/O subsystem 322). For example, the controller-to-controller interconnect 742 may be embodied as a QuickPath Interconnect (QPI), an UltraPath Interconnect (UPI), or other high-speed point-to-point interconnect utilized for controller-to-controller communications.

Figure 8:
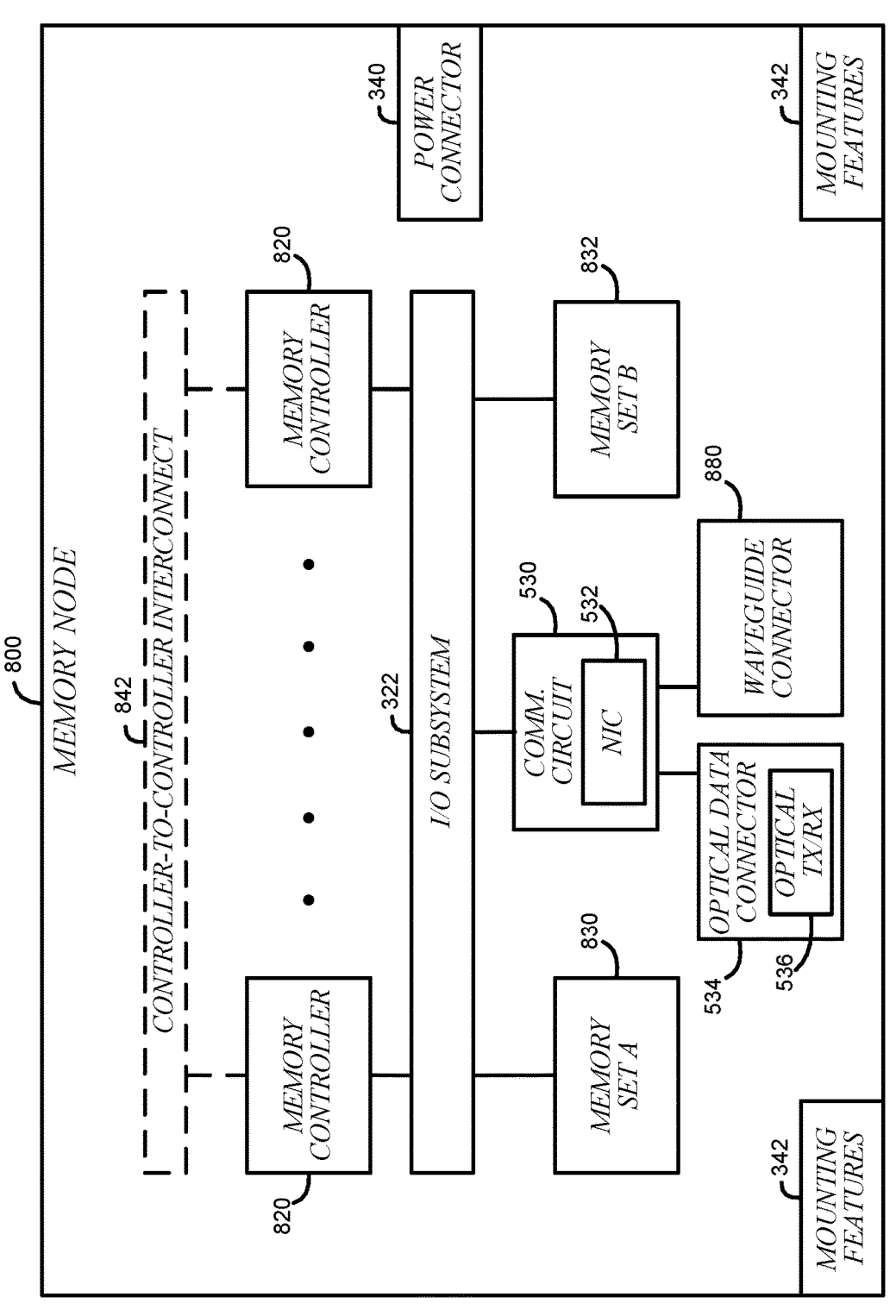
FIG. 8 is a simplified block diagram of at least one embodiment of a memory node usable in a data center.

Referring now to FIG. 8, in some embodiments, the node 300 may be embodied as a memory node 800. The memory node 800 is configured to provide other nodes 300 (e.g., compute nodes 500, accelerator nodes 600, etc.) with access to a pool of memory (e.g., in two or more sets 830, 832 of memory devices 420) local to the storage node 700. Also, additional external memory sets can be facilitated using communication circuit 530 and memory sets on memory node(s) located in other physical nodes (not shown). For example, during operation, a compute node 500 or an accelerator node 600 may remotely write to and/or read from one or more of the memory sets 830, 832 of the memory node 800 using a logical address space that maps to physical addresses in the memory sets 830, 832.

In the illustrative memory node 800, the physical resources 320 are embodied as memory controllers 820. Although only two memory controllers 820 are shown in FIG. 8, it should be appreciated that the memory node 800 may include additional memory controllers 820 in other embodiments. The memory controllers 820 may be embodied as any type of processor, controller, or control circuit capable of controlling the writing and reading of data into the memory sets 830, 832 based on requests received via the communication circuit 530. In the illustrative embodiment, each memory controller 820 is connected to a corresponding memory set 830, 832 to write to and read from memory devices 420 within the corresponding memory set 830, 832 and enforce permissions (e.g., read, write, etc.) associated with node 300 that has sent a request to the memory node 800 to perform a memory access operation (e.g., read or write).

In some embodiments, the memory node 800 may also include a controller-to-controller interconnect 842. Similar to the resource-to-resource interconnect 324 of the node 300 discussed above, the controller-to-controller interconnect 842 may be embodied as any type of communication interconnect capable of facilitating controller-to-controller communications. In the illustrative embodiment, the controller-to-controller interconnect 842 is embodied as a high-speed point-to-point interconnect (e.g., faster than the I/O subsystem 322). For example, the controller-to-controller interconnect 842 may be embodied as a QuickPath Interconnect (QPI), an UltraPath Interconnect (UPI), or other high-speed point-to-point interconnect utilized for controller-to-controller communications. As such, in some embodiments, a memory controller 820 may access, through the controller-to-controller interconnect 842, memory that is within the memory set 832 associated with another memory controller 820. In some embodiments, a scalable memory controller is made of multiple smaller memory controllers, referred to herein as "chiplets", on a memory node (e.g., the memory node 800). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 820 may implement a memory interleave (e.g., one memory address is mapped to the memory set 830, the next memory address is mapped to the memory set 832, and the third address is mapped to the memory set 830, etc.). The interleaving may be managed within the memory controllers 820, or from CPU sockets (e.g., of the compute node 500) across network links to the memory sets 830, 832, and may improve the latency and bandwidth associated with performing memory access operations as compared to accessing contiguous memory addresses from the same memory device.

Further, in some embodiments, the memory node 800 may be connected to one or more other nodes 300 (e.g., in the same rack 240 or an adjacent rack 240) through a waveguide, using the waveguide connector 880. Using a waveguide may provide high throughput access to the memory pool (e.g., the memory sets 830, 832) to another node (e.g., a node 300 in the same rack 240 or an adjacent rack 240 as the memory node 800) without adding to the load on the optical data connector 534.

Figure 9:
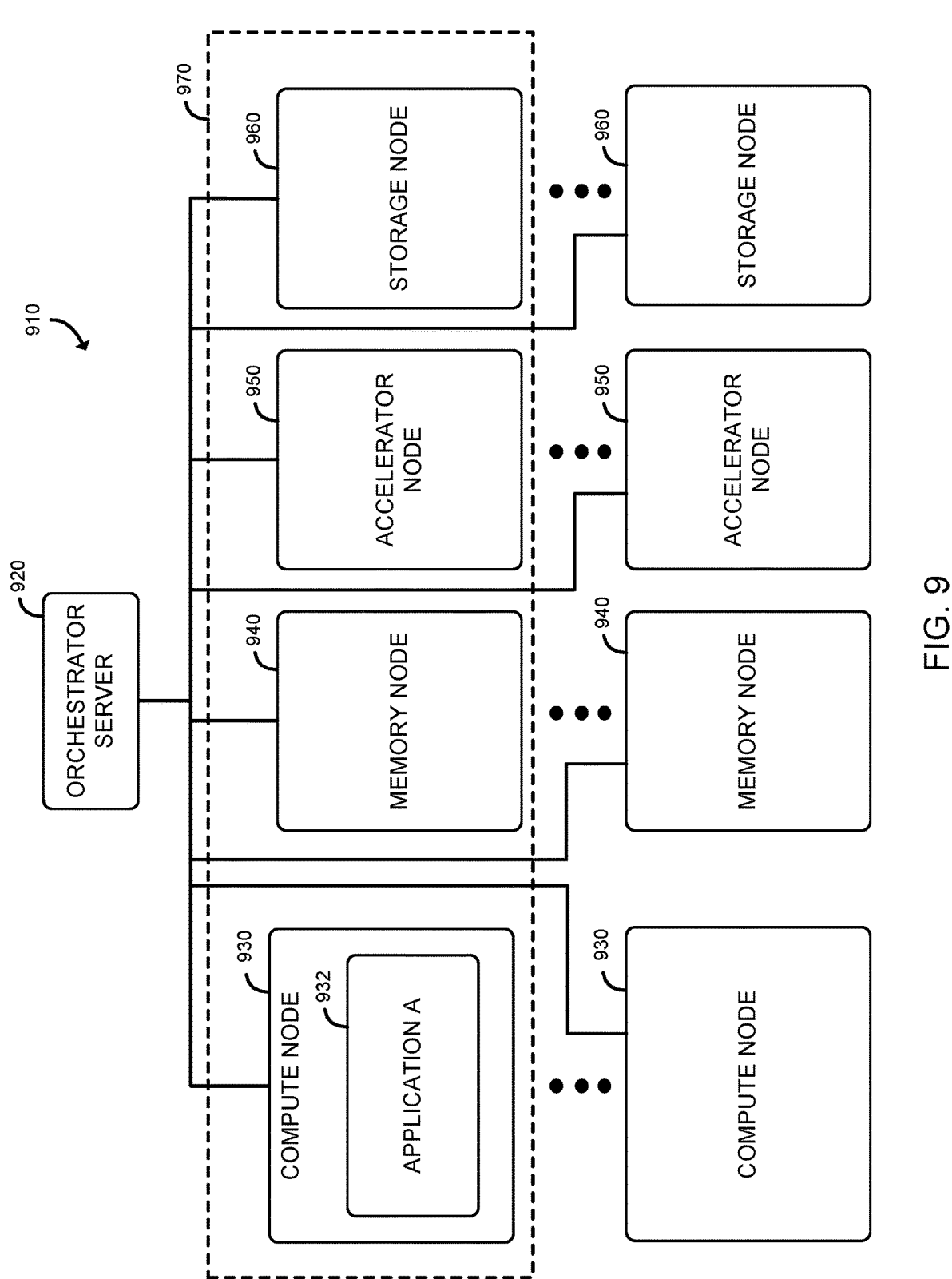
FIG. 9 depicts a system for executing one or more workloads.

Referring now to FIG. 9, a system 910 for executing one or more workloads (e.g., applications or microservices) may be implemented. In the illustrative embodiment, the system 910 includes an orchestrator server 920, which may be embodied as a managed node comprising a compute device (e.g., a processor 520 on a compute node 500) executing management software (e.g., a cloud operating environment, such as OpenStack) that is communicatively coupled to multiple nodes 300 including a large number of compute nodes 930 (e.g., each similar to the compute node 500), memory nodes 940 (e.g., each similar to the memory node 800), accelerator nodes 950 (e.g., each similar to the accelerator node 600), and storage nodes 960 (e.g., each similar to the storage node 700). One or more of the nodes 930, 940, 950, 960 may be grouped into a managed node 970, such as by the orchestrator server 920, to collectively perform a workload (e.g., an application 932 executed in a virtual machine or in a container). While orchestrator node 920 is shown as a single entity, alternatively or additionally, its functionality can be distributed across multiple instances and physical locations.

The managed node 970 may be embodied as an assembly of physical resources 320, such as processors 520, memory resources 420, accelerator circuits 620, or data storage 750, from the same or different nodes 300. Further, the managed node 970 may be established, defined, or "spun up" by the orchestrator server 920 at the time a workload is to be assigned to the managed node 970, and may exist regardless of whether a workload is presently assigned to the managed node 970. In the illustrative embodiment, the orchestrator server 920 may selectively allocate and/or deallocate physical resources 320 from the nodes 300 and/or add or remove one or more nodes 300 from the managed node 970 as a function of quality of service (QoS) targets (e.g., a target throughput, a target latency, a target number of instructions per second, etc.) associated with a service level agreement or class of service (COS or CLOS) for the workload (e.g., the application 932). In doing so, the orchestrator server 920 may receive telemetry data indicative of performance conditions (e.g., throughput, latency, instructions per second, etc.) in each node 300 of the managed node 970 and compare the telemetry data to the quality-of-service targets to determine whether the quality of service targets are being satisfied. The orchestrator server 920 may additionally determine whether one or more physical resources may be deallocated from the managed node 970 while still satisfying the QoS targets, thereby freeing up those physical resources for use in another managed node (e.g., to execute a different workload). Alternatively, if the QoS targets are not presently satisfied, the orchestrator server 920 may determine to dynamically allocate additional physical resources to assist in the execution of the workload (e.g., the application 932) while the workload is executing. Similarly, the orchestrator server 920 may determine to dynamically deallocate physical resources from a managed node 970 if the orchestrator server 920 determines that deallocating the physical resource would result in QoS targets still being met.

Additionally, in some embodiments, the orchestrator server 920 may identify trends in the resource utilization of the workload (e.g., the application 932), such as by identifying phases of execution (e.g., time periods in which different operations, each having different resource utilizations characteristics, are performed) of the workload (e.g., the application 932) and pre-emptively identifying available resources in the data center and allocating them to the managed node 970 (e.g., within a predefined time period of the associated phase beginning). In some embodiments, the orchestrator server 920 may model performance based on various latencies and a distribution scheme to place workloads among compute nodes 930 and other resources (e.g., accelerator nodes, memory nodes, storage nodes) in the data center. For example, the orchestrator server 920 may utilize a model that accounts for the performance, including optionally previously collected historical performance, of resources on the nodes 300 (e.g., FPGA performance, memory access latency, etc.) and the performance (e.g., congestion, latency, bandwidth) of the path through the network to the resource (e.g., FPGA). As such, the orchestrator server 920 may determine which resource(s) should be used with which workloads based on the total latency associated with each potential resource available in the data center 100 (e.g., the latency associated with the performance of the resource itself in addition to the latency associated with the path through the network between the compute node executing the workload and the node 300 on which the resource is located).

In some embodiments, the orchestrator server 920 may generate a map of heat generation in the data center 100 using telemetry data (e.g., temperatures, fan speeds, etc.) reported from the nodes 300 and allocate resources to managed nodes as a function of the map of heat generation and predicted heat generation associated with different workloads, to maintain a target temperature and heat distribution in the data center 100. Additionally or alternatively, in some embodiments, the orchestrator server 920 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 920 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 920 may identify patterns in resource utilization phases of the workloads and use the patterns to predict future resource utilization of the workloads.

To reduce the computational load on the orchestrator server 920 and the data transfer load on the network, in some embodiments, the orchestrator server 920 may send self-test information to the nodes 300 to enable each node 300 to locally (e.g., on the node 300) determine whether telemetry data generated by the node 300 satisfies one or more conditions (e.g., an available capacity that satisfies a predefined threshold, a temperature that satisfies a predefined threshold, etc.). Each node 300 may then report back a simplified result (e.g., yes or no) to the orchestrator server 920, which the orchestrator server 920 may utilize in determining the allocation of resources to managed nodes.

Embodiments described herein can be used in a data center or disaggregated composite nodes. The techniques described herein can apply to both disaggregated and traditional server architectures. A traditional server can include a CPU, XPU, one or more memory devices, networking communicatively coupled to one or more circuit boards within a server.

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in a high-performance compute data center or cloud installation; a designated edge node server, an enterprise server, a roadside server, a telecom central office; or a local or peer at-the-edge device being served consuming edge services).

With the illustrative edge networking systems described below, computing and storage resources are moved closer to the edge of the network (e.g., closer to the clients, endpoint devices, or "things"). By moving the computing and storage resources closer to the device producing or using the data, various latency, compliance, and/or monetary or resource cost constraints may be achievable relative to a standard networked (e.g., cloud computing) system. To do so, in some examples, pools of compute, memory, and/or storage resources may be located in, or otherwise equipped with, local servers, routers, and/or other network equipment. Such local resources facilitate the satisfying of constraints placed on the system. For example, the local compute and storage resources allow an edge system to perform computations in real-time or near real-time, which may be a consideration in low latency user-cases such as autonomous driving, video surveillance, and mobile media consumption. Additionally, these resources will benefit from service management in an edge system which provides the ability to scale and achieve local service level agreements (SLAs) or service level objectives (SLOs), manage tiered service requirements, and enable local features and functions on a temporary or permanent basis.

A pool can include a device on a same chassis or different physically dispersed devices on different chassis or different racks. A resource pool can include homogeneous processors, homogeneous processors, and/or a memory pool. Pooling of heterogeneous resources can be implemented using multiple homogeneous resource pools.

An illustrative edge computing system may support and/or provide various services to endpoint devices (e.g., client user equipment (UEs)), each of which may have different requirements or constraints. For example, some services may have priority or quality-of-service (QoS) constraints (e.g., traffic data for autonomous vehicles may have a higher priority than temperature sensor data), reliability and resiliency (e.g., traffic data may require mission-critical reliability, while temperature data may be allowed some error variance), as well as power, cooling, and form-factor constraints. These and other technical constraints may offer significant complexity and technical challenges when applied in the multi-stakeholder setting.

Figure 10:
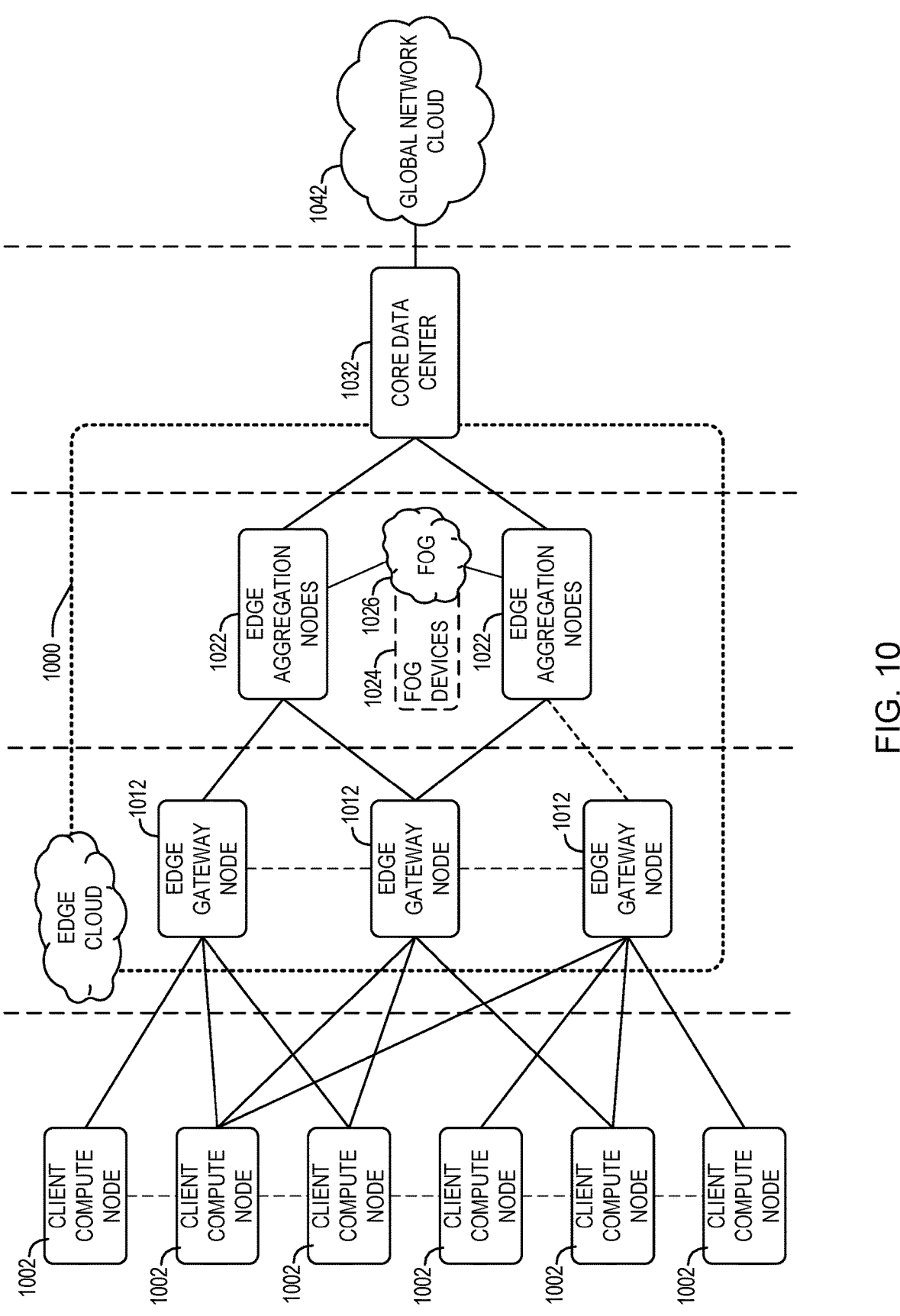
FIG. 10 depicts an example system.

FIG. 10 generically depicts an edge computing system 1000 for providing edge services and applications to multi-stakeholder entities, as distributed among one or more client compute nodes 1002, one or more edge gateway nodes 1012, one or more edge aggregation nodes 1022, one or more core data centers 1032, and a global network cloud 1042, as distributed across layers of the network. One or more microservices can execute on one or more nodes and/or data center. The implementation of the edge computing system 1000 may be provided at or on behalf of a telecommunication service provider ("telco", or "TSP"), internet-of-things service provider, cloud service provider (CSP), enterprise entity, or any other number of entities. Various implementations and configurations of the edge computing system 1000 may be provided dynamically, such as when orchestrated to meet service objectives.

For example, the client compute nodes 1002 are located at an endpoint layer, while the edge gateway nodes 1012 are located at an edge devices layer (local level) of the edge computing system 1000. Additionally, the edge aggregation nodes 1022 (and/or fog devices 1024, if arranged or operated with or among a fog networking configuration 1026) are located at a network access layer (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement. Fog computing in many scenarios provide a decentralized architecture and serves as an extension to cloud computing by collaborating with one or more edge node devices, providing the subsequent amount of localized control, configuration and management, and much more for end devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 1032 is located at a core network layer (a regional or geographically-central level), while the global network cloud 1042 is located at a cloud data center layer (a national or world-wide layer). The use of "core" is provided as a term for a centralized network location—deeper in the network—which is accessible by multiple edge nodes or components; however, a "core" does not necessarily designate the "center" or the deepest location of the network. Accordingly, the core data center 1032 may be located within, at, or near the edge computing system 1000. Although an illustrative number of client compute nodes 1002, edge gateway nodes 1012, edge aggregation nodes 1022, edge core data centers 1032, global network clouds 1042 are shown in FIG. 10, it should be appreciated that the edge computing system 1000 may include additional devices or systems at each layer. Devices at a layer can be configured as peer nodes to each other and, accordingly, act in a collaborative manner to meet service objectives.

Consistent with the examples provided herein, a client compute node 1002 may be embodied as any type of endpoint component, device, appliance, or other thing capable of communicating as a producer or consumer of data. Further, the label "node" or "device" as used in the edge computing system 1000 does not necessarily mean that such node or device operates in a client or agent/minion/follower role; rather, one or more of the nodes or devices in the edge computing system 1000 refer to individual entities, nodes, or subsystems which include discrete or connected hardware or software configurations to facilitate or use the edge computing system 1000.

As such, the edge computing system 1000 is formed from network components and functional features operated by and within the edge gateway nodes 1012 and the edge aggregation nodes 1022. The edge computing system 1000 may be embodied as any type of deployment that provides edge computing and/or storage resources which are proximately located to radio access network (RAN) capable endpoint devices (e.g., mobile computing devices, IoT devices, smart devices, etc.), which are shown in FIG. 10 as the client compute nodes 1002. In other words, the edge computing system 1000 may be envisioned as an "edge"

which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge computing system 1000 may form a portion of or otherwise provide an ingress point into or across a fog networking configuration 1026 (e.g., a network of fog devices 1024, not shown in detail), which may be embodied as a system-level horizontal and distributed architecture that distributes resources and services to perform a specific function. For instance, a coordinated and distributed network of fog devices 1024 may perform computing, storage, control, or networking aspects in the context of an IoT system arrangement. Other networked, aggregated, and distributed functions may exist in the edge computing system 1000 between the core data center 1032 and the client endpoints (e.g., client compute nodes 1002). Some of these are discussed in the following sections in the context of network functions or service virtualization, including the use of virtual edges and virtual services which are orchestrated for multiple stakeholders.

As discussed in more detail below, the edge gateway nodes 1012 and the edge aggregation nodes 1022 cooperate to provide various edge services and security to the client compute nodes 1002. Furthermore, because a client compute node 1002 may be stationary or mobile, a respective edge gateway node 1012 may cooperate with other edge gateway devices to propagate presently provided edge services, relevant service data, and security as the corresponding client compute node 1002 moves about a region. To do so, the edge gateway nodes 1012 and/or edge aggregation nodes 1022 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge computing system 1000. In a multi-stakeholder environment, there can be multiple loadable security modules (LSMs) used to provision policies that enforce the stakeholder's interests. Enforcement point environments could support multiple LSMs that apply the combination of loaded LSM policies (e.g., where the most constrained effective policy is applied, such as where if one or more of A, B or C stakeholders restricts access then access is restricted). Within the edge computing system 1000, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

Figure 11:
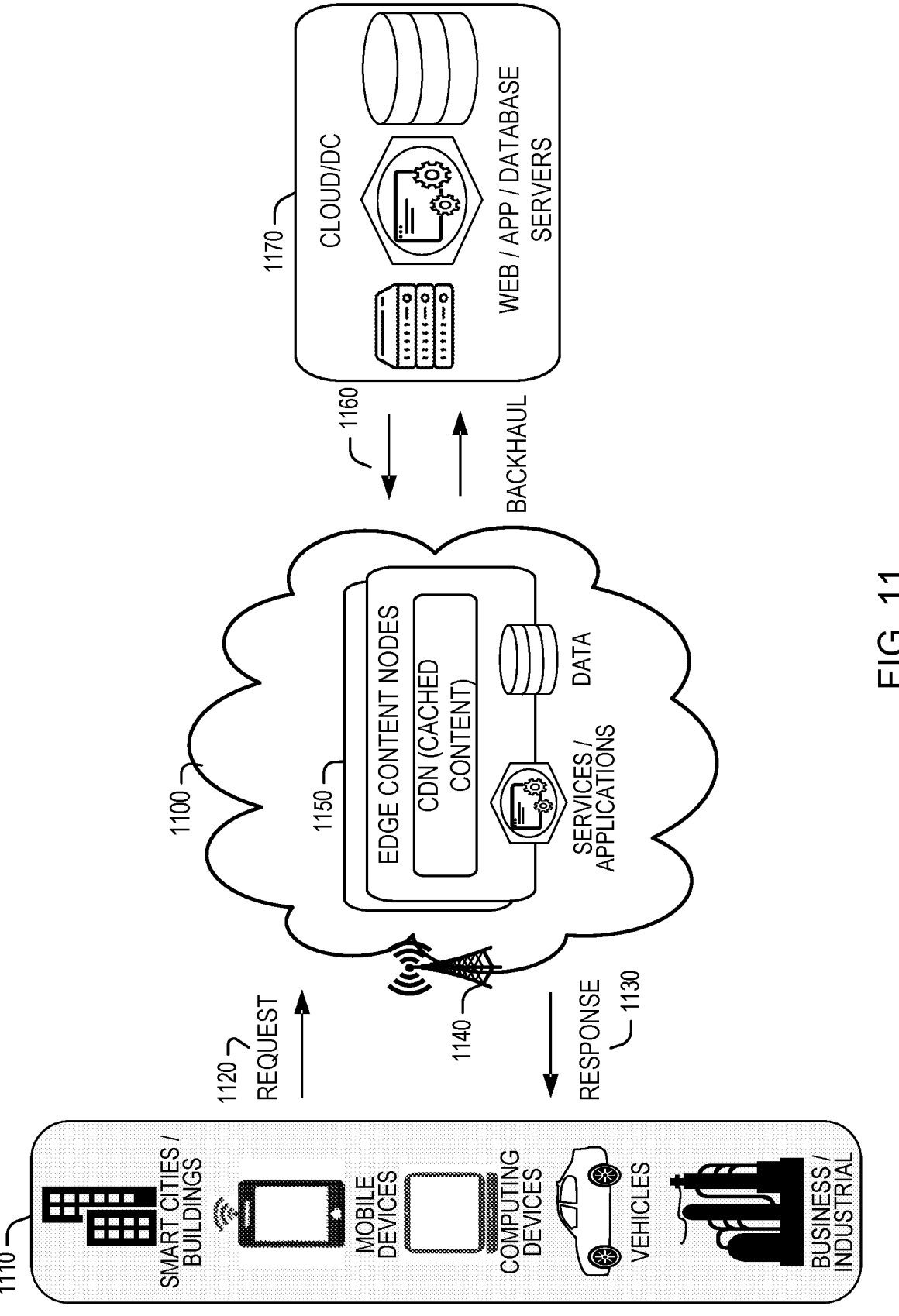
FIG. 11 shows an example system.

FIG. 11 shows an example where various client endpoints 1110 (in the form of mobile devices, computers, autonomous vehicles, business computing equipment, industrial processing equipment) provide requests 1120 for services or data transactions, and receive responses 1130 for the services or data transactions, to and from the edge cloud 1100 (e.g., via a wireless or wired network 1140). One or more microservices can execute on one or more nodes and/or data center. Within the edge computing system 1000, the CSP may deploy various compute and storage resources, such as edge content nodes 1150 to provide cached content from a distributed content delivery network. Other available compute and storage resources available on the edge content nodes 1150 may be used to execute other services and fulfill other workloads. The edge content nodes 1150 and other systems of the edge computing system 1000 are connected to a cloud or data center 1170, which uses a backhaul network 1160 to fulfill higher-latency requests from a cloud/data center for websites, applications, database servers, etc.

Figure 12:
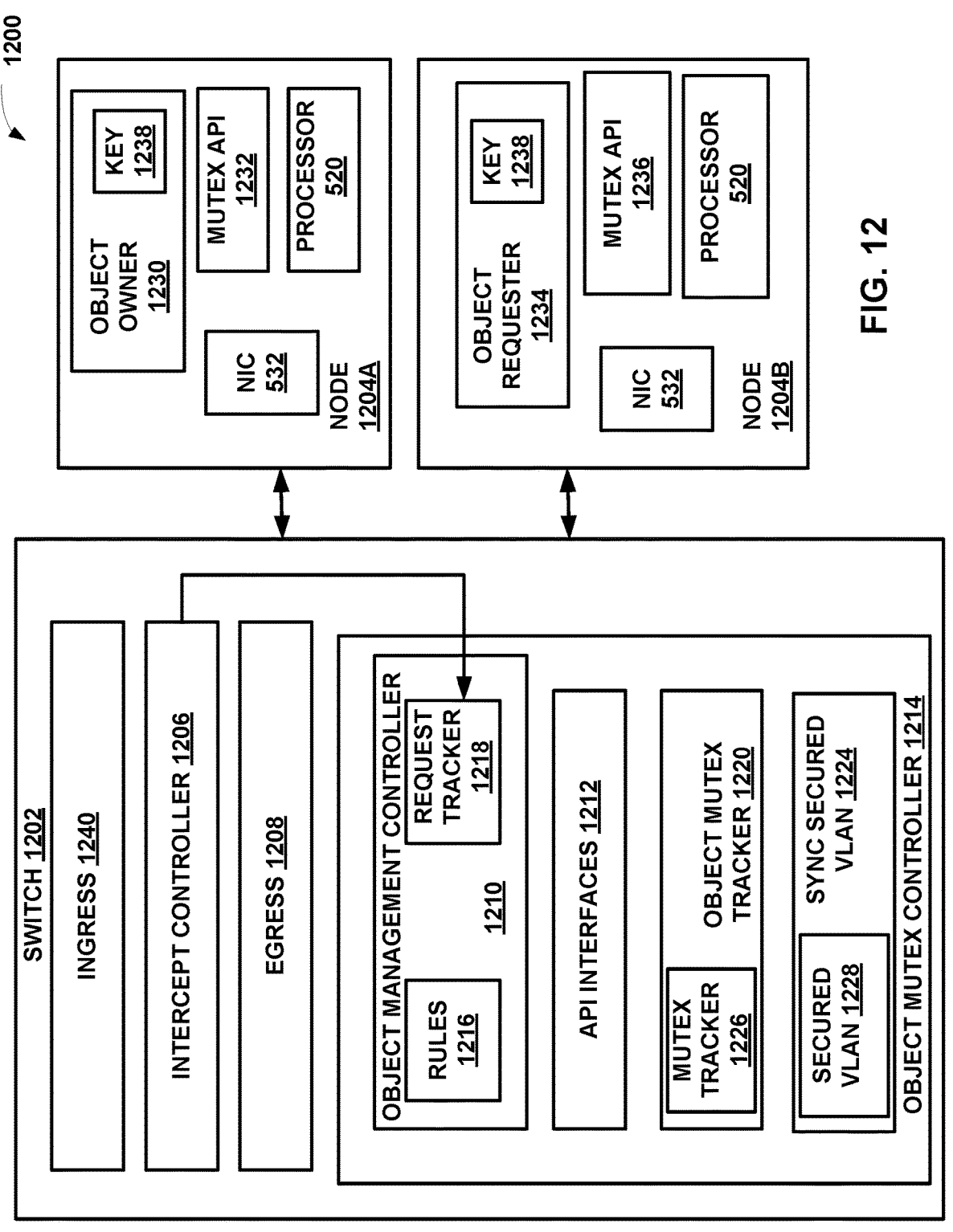
FIG. 12 is a simplified block diagram of a system that includes a switch and nodes that may be included in the data center shown in FIG. 1.

FIG. 12 is a simplified block diagram of a system 1200 that includes a switch 1202 and nodes 1204A, 1204B that may be included in the data center 100 shown in FIG. 1. The switch 1202 routes data communications to and from the nodes 1204A, 1204B and can be positioned at the top of rack (TOR) (referred to as a top of rack switch), end of row (EOR), middle of rack (MOR) or can be a spine switch 150 that switches communications among systems (e.g., the systems 110, 120, 130, 140) in the data center 100.

The switch 1202 includes ingress circuitry 1240 to process packets/frames received by the switch 1202 and egress circuitry 1208 to process packets/frames to be transmitted by the switch 1202.

A mutex (multiple exclusion) is a synchronization object used to co-ordinate mutually exclusive access to a resource that is shared by multiple processes. The mutex is used to give exclusive access to a resource to only one process at a time. The mutex is set before using a shared resource and released after using the shared resource. Examples of resources include objects, data blocks, network resources including buffers, memory, and network interfaces, acceleration processors, FPGAs and sensors. The resources are used by an application composed of microservices.

The switch 1202 includes an object mutex controller 1214 (the object mutex controller can also be referred to as a resource mutex controller) to manage mutexes used to co-ordinate mutually exclusive access to resources that are shared by nodes 1204A, 1204B. The object mutex controller 1214 provides mechanisms to manage access to resources (for example, objects) that are being concurrently processed by two or more nodes 1204A, 1204B in the data center 100 and to provide exclusive access to an object shared by nodes to one of the nodes. The switch 1202 includes intercept controller 1206 to forward packets/frames received by the switch 1202 from nodes 1204A, 1204B for processing by the object mutex controller 1214. The packets/frames can include data, code, machine learning (ML) models, electronic contracts, transactions, telemetry and/or control signals. The object mutex controller 1214 and the intercept controller 1206 can be included in a switch system-on-chip (SoC).

The API interface between the nodes 1204A, 1204B and the switch 1202 can use representational state transfer (REST). REST is a set of guidelines for creating web APIs based on HTTP methods to access resources via Uniform Resource Locator (URL)-encoded parameters and the use of JavaScript Object Notation (JSON) or Extensible Markup Language (XML) to transmit data.

The intercept controller 1206 can identify whether a request for a mutex for a resource is for an resource that is managed locally in the switch 1202 or a remote resource to be accessed through an egress port in egress circuitry 1208. If the resource is managed locally, the intercept controller 1206 forwards the request for the mutex for the resource to the object mutex controller 1214.

The object mutex controller 1214 provides primitives for acquiring and releasing mutexes with the ability to acquire extensions for currently held mutexes. The tenant holding the mutex can request to extend the expiration period on the mutex. In response to the request, the expiration time can be reset without releasing the lock.

Mutexes that are not surrendered after an approved duration are reclaimed and the process/processes holding the mutexes are placed in indefinite suspension until a process unwinds their interrupted transaction sequences. In an embodiment, a transaction log contains the necessary information to restart or rollback the transactions that did not complete due to lack of resources. A transaction cleanup process can read the transaction log, determine whether to unwind or restart the transaction and then apply the action.

The object mutex controller 1214 includes an object management controller 1210, API interfaces 1212, object mutex tracker 1220 and a synchronous secured Virtual Local Area Network (VLAN) 1224. In other embodiments, instead of VLAN, the network encapsulation protocol can be Virtual Extensible LAN (VxLAN) or Generic Network Virtualization (GENEVE).

API interfaces 1212 includes an API for creating, initializing, acquiring/releasing, timing-out, and timing-extension, mutexes. API interfaces also includes an API to allow mutexes to be acquired together and/or released together by a software agent (which is identified by a unique identifier). API interfaces 1212 can also include wait-until and abort-wait APIs in order respectively to wait for an event being signaled within a maximum wait duration and to issue a signal to a requestor.

A first API allows registration of a mutex for a resource that is owned or managed by an entity. The registration allows specifying the object identifier being registered, a filtering rule that defines access to the mutex and a network rule that defines network-based rules that can be defined based on network masks or another network based Boolean rule. The filtering rule can be a Boolean rule that can be defined based on the requestor of the mutex for the resource or other fields that can be associated with requestors that will use the mutex. Registration of the mutex can fail if there is not sufficient capacity in the switch 1202 to track another mutex or the setup parameters for the mutex are incorrect. Setup parameters can include a default to mutex unallocated allowing resources associated with the mutex to be scheduled.

A second API allows requesting access to a mutex that has been previously created. The request to access the mutex includes the object identifier (ID) that is requesting access to the mutex, the type of access that is requested for the object and the time duration for which the mutex is requested. The type of access can be read, write, or read and write. The time duration of the request for the mutex indicates the length of time that the mutex is required after an acknowledgment of access is received.

Other APIs co-ordinate access between consumers identified as frequent accessors to the mutex. These APIs are used when objects are accessed in high frequency and ping pong effects may occur across the various consumers. More details will be provided later.

Object management controller 1210 includes object management rules 1216 and a request tracker 1218. The object management controller 1210 uses the API interfaces 1212 to implement a communication flow with object owners and object requestors.

Object mutex tracker 1220 includes mutex tracker 1226. The object mutex tracker 1220 manages information stored in the mutex tracker 1226 that relates to objects that are being tracked by the switch 1202 and the current owners of the mutexes for the tracked objects.

Synchronous secured VLAN 1224 includes secured VLAN 1228. A set of nodes (for example, nodes 1204A, 1204B) that belong to the same tenant or groups of tenants can create a Synchronous VLAN. The switch 1202 generates a private key 1238 that is part of the Synchronous VLAN and shared with tenants' applications participating in a synchronization domain. Tenants can access the intercept controller 1206, object management controller 1210 and object mutex tracker 1220 using the private key 1238. Resources can be partitioned based on a security sensitivity rating. Different private keys may be correlated to the different security sensitivity ratings. The switch 1202 can use the private key 1238 to perform the update based on the security sensitivity rating.

Nodes 1204A, 1204B include a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the node 1204A, 1204B to connect with another nodes 1204A, 1204B. In some embodiments, the NIC 532 may be embodied as part of a system-on-a-chip (SoC) that includes one or more processors, or included on a multichip package that also contains one or more processors. In some embodiments, the NIC 532 may include a local processor (not shown) and/or a local memory (not shown) that are both local to the NIC 532. The switch 1202 is configured to support unicast and multicast communication between the nodes 1204A, 1204B and the switch 1202.

Nodes 1204A, 1204B also include a processor 520 and a mutex application program interface (API) 1232. In the embodiment shown, node 1204A includes object owner 1230 and node 1204B includes object requester 1234. The object owner 1230 and object requester 1234 can include the private key 1238.

For example, the operating system can translate mutex API 1232 can translate standard Linux mutex calls that are used to lock and unlock a mutex for an object to a REST API that is used to configure the switch or the operating system can use a library that translates the standard Linux mutex calls to the REST API Standard Linux mutex calls include pthread_mutex_lock( ) pthread_mutex_unlock( ) and pthread_mutex_trylock( ) The mutex for the object can be locked by a call to pthread_mutex_lock( ) unlocked by a call to pthread_mutex_unlock( ) and the status of the mutex (locked, unlocked) can be obtained by a call to pthread_mutex_trylock( ).

When the mutex for an object is owned by a first tenant, the first tenant is the object owner 1230. When a second tenant wants access to the object, the second tenant makes a request and becomes the object requestor. The object mutex controller 1214 negotiates the transfer of ownership from the first tenant to the second tenant.

To acquire a mutex, a node sends a packet with header fields indicating type of operation, topological information (tree index) of the other processes, lease info etc. to the ingress circuitry 1240 in the switch 1202. The response to the request to acquire the mutex are sent in a packet (a response packet) via egress circuitry 1208 in the switch 1202 to the node. The switch 1202 can use Programmable Packet Processing Pipeline (P4) to parse the header fields in the packet, use some stateful registers to record the mutex for the requesting node and then proactively multicast the packet to the nodes. Before multicasting, the switch 1202 can include a monotonically increasing number in the packet as a sequence number so that receiving nodes can differentiate the order of requests for mutexes. In other embodiments, a node can send a query message first to the switch 1202 to check if there are existing locked resources and to obtain the lease information for the locked resources. The lease information identifies when the locked resource is scheduled for release.

Figure 13:
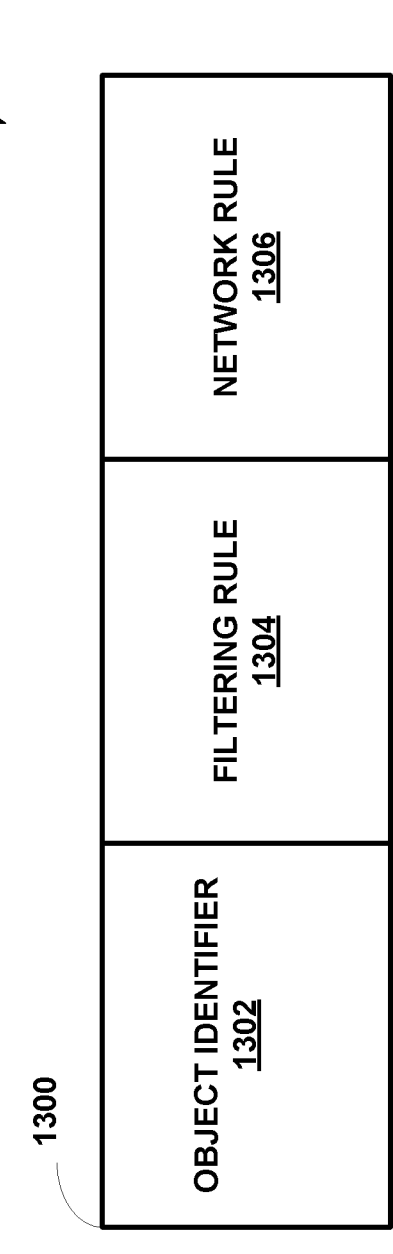
FIG. 13 illustrates an example of an object management rules entry in the object management rules in the object management controller in the switch.

FIG. 13 illustrates an example of an object management rules entry 1300 in the object management rules 1216 in the object management controller 1210 in the switch 1202. The object management rules entry 1300 in the object management rules 1216 stores rules for an object that is owned or managed by an entity (for example, node 1204A). The object is identified by an object identifier 1302 that is stored in the object management rules entry 1300. In an embodiment, the object identifier 1302 is a Universally Unique Identifier (UUID), for example, a 36-character alphanumeric string. The rules associated with the object identifier 1302 can include a filtering rule 1304 and a network rule 1306.

The filtering rule 1304 can define a tenant (for example, User Equipment (UE) or a User Agent (UA) an entity that can access the object identified by the object identifier 1302 that is stored in the object management rules entry 1300. The filtering rule 1304 can be a Boolean rule (for example, the Boolean rule can describe resource dependencies where a first resource is allocated if a second resource is also allocated, for example, Allocate A IF (A and B) are allocated) defined based on the requestors or other fields associated with requestors that use the mutex object (for example, other telemetry data that pertain to the switch or the resources in the switch such as network addresses, network interfaces and network packets).

The network rule 1306 defines network-based filtering rules based on network masks (for example, Subnet=10.34.x.x) or other network based Boolean rules. Network masks is a routing technique that masks a portion of the network address so that multiple packets to different endpoints can be routed to the same network domain (for example, Subnet=10.34.x.x). Boolean rules (also referred to as Boolean algebra) can include routing logic and allocate all resources within the subnet 10.34.x.x. An example of a network based Boolean rule is "IF Resource-A @ 10.34.x.x is available AND Resource-B @ 10.35.x.x is available THEN request Resource-C @ 10.36.x.x"

Figure 14:
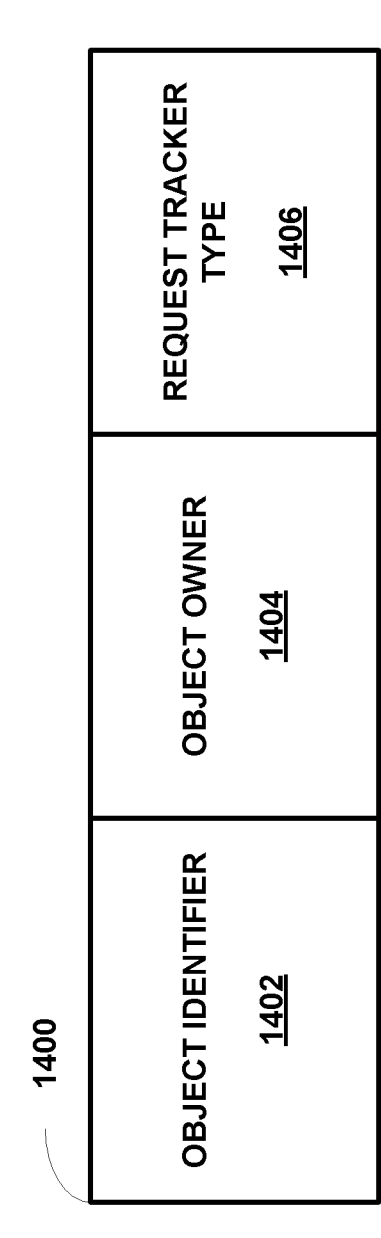
FIG. 14 illustrates an example of a request tracker entry in the request tracker in object management controller in the switch.

FIG. 14 illustrates an example of a request tracker entry 1400 in the request tracker 1218 in object management controller 1210 the switch 1202. The request tracker entry 1400 includes an object identifier 1402, an object owner 1404 and a request tracker type 1406. In an embodiment, the object identifier 1302 is a UUID and the object owner 1404 is a UUID. The request tracker type 1406 stores the tracker mutex type, for example, read or write mutex.

Figure 15:
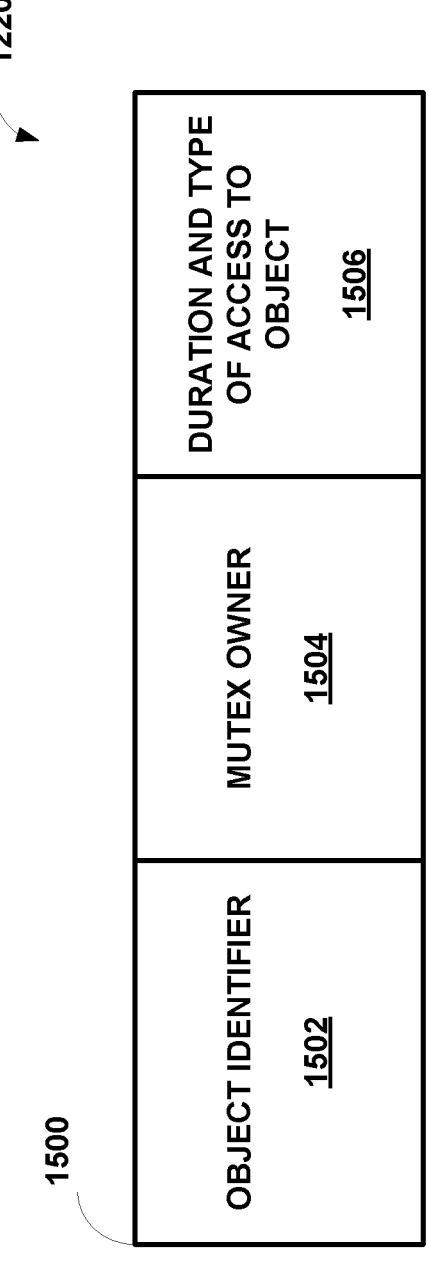
FIG. 15 illustrates an example of a mutex tracker entry in the mutex tracker in the switch.

FIG. 15 illustrates an example of a mutex tracker entry 1500 in the mutex tracker 1226 in the switch 1202. The mutex tracker entry 1500 in the mutex tracker 1226 includes an object identifier 1502, a mutex owner 1504 and duration and type of access to object 1506. The mutex tracker entry 1500 is used to request access to an object.

The object identifier 1502 stores an identifier for the object for which the mutex is being requested. In an embodiment, the object identifier 1502 is a UUID. The mutex owner 1504 stores an identifier for the owner of the mutex for the object. In an embodiment, the identifier for the owner of the mutex is a UUID.

The duration and type of mutex 1506 stores the type of access requested for the object and the length of time for which the mutex is required for the object. The type of access can be read-only, write-only, read-write or readmodify-write access. The duration of the request for the mutex for the object indicates the length of time that the object is required after an acknowledge is received. The length of time that the object is required does not include latency associated with signaling to indicate that the object is locked.

Figure 16:
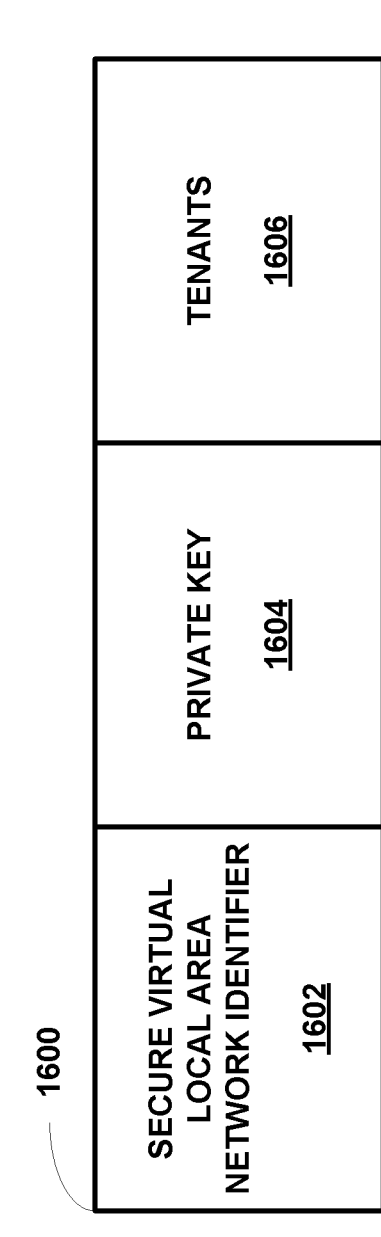
FIG. 16 illustrates an example of a synchronous secured VLAN entry in the synchronous secured VLAN in the switch.

FIG. 16 illustrates an example of a synchronous secured VLAN entry 1600 in the synchronous secured VLAN 1224 in the switch 1202. The synchronous secured VLAN entry 1600 is used to create secure synchronization domains. The synchronous secured VLAN entry 1600 includes a secure virtual local area network identifier 1602, a private key 1604 and tenants 1606. In an embodiment, the secure virtual local area network identifier 1602 is a Universally Unique Identifier (UUID), the private key 1604 stores the private key for the synchronous VLAN, and the tenants 1606 stores a list of UUIDs for tenants in the secure synchronization domain.

A synchronous secured VLAN can be created for a set of nodes owned by the same tenant or groups of tenants. Intercept controller 1206 in the switch 1202 authenticates object requests that use a tenant specific key to establish a secure session to the switch 1202. The intercept controller 1206 in the switch 1202 generates the private key 1604 for the synchronous secured VLAN. The private key 1604 is shared with the tenants' applications participating in the synchronous secured VLAN. The secure virtual local area network identifier 1602 for the synchronous secured VLAN is used to generate and manage objects.

Tenants have access to mutexes using the private key 1604. The switch 1202 uses the private key 1604 to update mutexes. Tenants may access a variety of resources/objects via mutexes where the tenants' identity is authenticated using a private key 1604 (private key 1238). Use of a synchronous secured VLAN enables multiple mutex actions (lock/unlock) over multiple resources to occur in synchronized order due to the synchronous secured VLAN having reliable transport properties.

Figure 17:
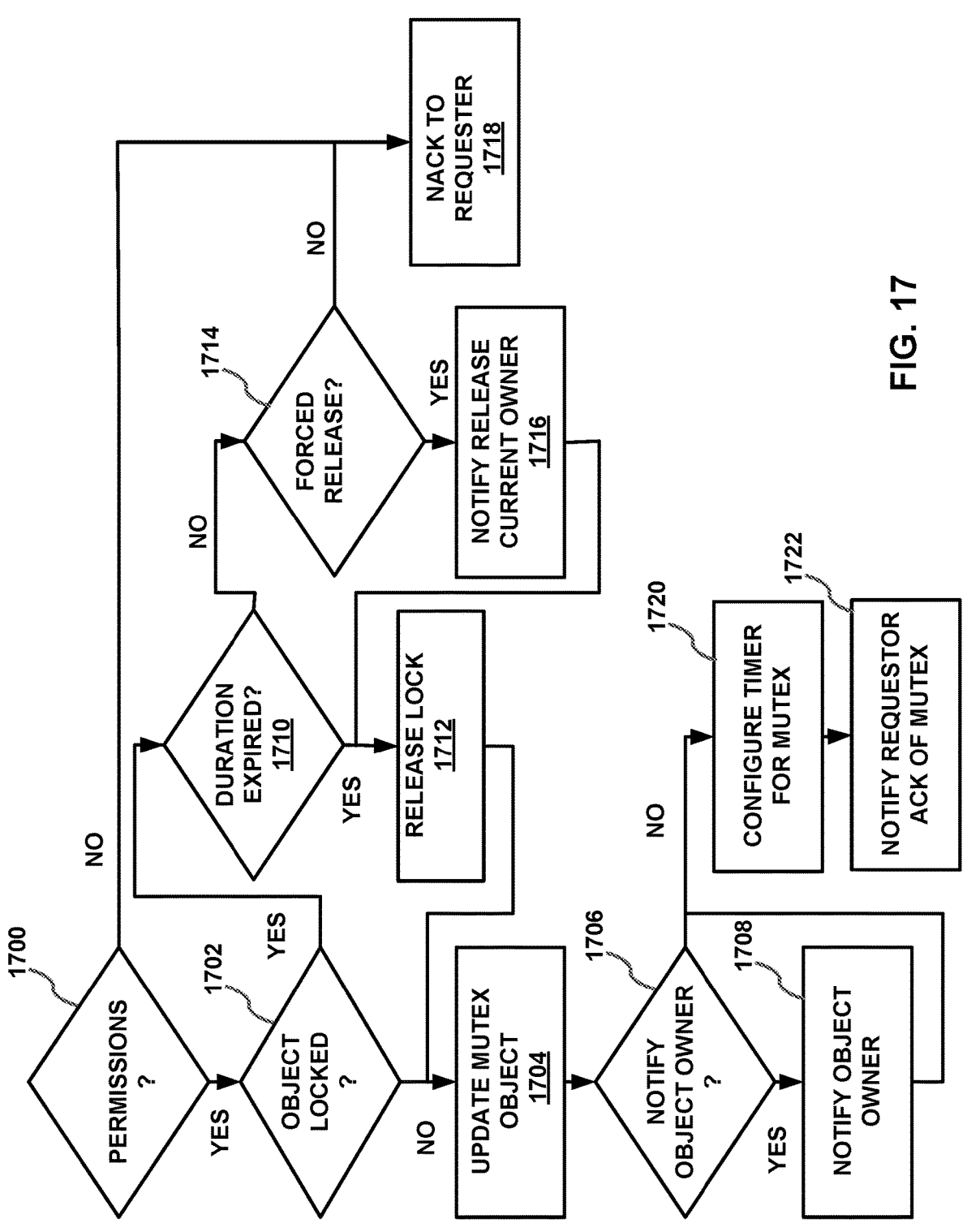
FIG. 17 is a flow graph illustrating a method performed in the switch to process a request received from a node for a mutex for an object.

FIG. 17 is a flow graph illustrating a method performed in the switch 1202 to process a request received from a node 1204A, 1204B for a mutex for an object. A mutex is a lock that is shared by multiple processes. The request for the mutex can be sent from the object requester 1234 in node 1204B via mutex API 1236 to the switch 1202. Mutex API 1236 can send Request Mutex (object, type, duration) to the switch 1202 in a packet using a web application program interface (API). The intercept controller 1206 forwards the Request Mutex (object, type, duration) received in the packet to API interfaces 1212 in the switch 1202. Object is the UUID for the object, type is the type of access (read, write, or read and write), duration is the length of time for which the mutex for the object is required by the requester (for example, node 1204B).

At block 1700, object management controller 1210 checks network rule 1306 in the object management rules entry 1300 in object management rules 1216 for the requestor to determine if the requestor has permission to access the object. Network rule 1306 is a network filtering rule. Examples of network filtering rules include did the request arrive over the anticipated network interface or subnet (as specified by a subnet mask) or did the request arrive via an expected application protocol such as TCP Port 80.

If the requestor has permission, processing continues with block 1702. If the requestor does not have permission, processing continues with block 1720.

At block 1702, the mutex owner 1504 for the object (object identifier 1502) in the mutex tracker 1226 is read to determine if the object is locked. If the object is locked, processing continues with block 1710. If the object is not locked, processing continues with block 1704.

At block 1704, the owner of the mutex for the object is updated. Processing continues with block 1706.

At block 1706, if the owner of the object requires an update when the mutex for the object is requested, processing continues with block 1708. If not, processing continues with block 1720.

At block 1708, a notification is sent to the owner of the object. Processing continues with block 1720.

At block 1710, if the timer for the owner of the mutex has expired, processing continues with block 1718. If not, processing continues with block 1714.

At block 1712, the timer for the last owner of the mutex has expired, the mutex is released. A notification to the last owner of the mutex can be generated. Processing continues with block 1704.

At block 1714, the timer for the last mutex has not expired. If the object owner has provided a release time for the object that has expired, a forced release is required, processing continues with block 1716.

At block 1716, a notification is sent to the current owner of the mutex. Processing continues with block 1712 to release the mutex.

At block 1718, the requestor does not have permission to access the mutex object, a NACK message is generated and returned to the requester. Typically, a NACK message includes a session identifier that was supplied in the original request. The NACK message includes a negative acknowledgement as to the original request. For example, if the original request was to obtain a mutex for resource X, the NACK message identifies resource X and indicates failure to obtain the mutex.

At block 1720, a timer is configured with the duration of the mutex provided by the requestor in the request for the mutex. Processing continues with block 1722.

At block 1722, the requester of the mutex for the object is notified that access to the mutex for the object is accepted.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A non-transitory machine-readable storage media can cause a machine to perform the functions or operations described, and includes any mechanism that stores information in a form accessible by a machine (e.g., computing device, electronic system, etc.), such as record-able/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by refer-ence to the claims that follow.

What is claimed is:

1. A switch, the switch comprising:
an intercept controller to receive a packet from one of a plurality of nodes, the packet to include a request to acquire a mutex for an object shared by two or more of the plurality of nodes; and
a mutex controller to process the request to acquire the mutex for the object forwarded from the intercept controller, the mutex controller to provide access to the object to the one of the plurality of nodes if the mutex for the object is not being used and to reject the request to acquire the mutex for the object if the mutex for the object is being used;
wherein:
the request is associated with at least one tenant of multiple tenants;
the object is comprised in resources to be partitioned based at least in part upon security sensitivity rat-ings;
the security sensitivity ratings are associated with respective key data; and
tenant access to the resources is to be based at least in part upon the respective key data.

2. The switch of claim 1, wherein the packet includes a web Application Program Interface that includes the request for the mutex for the object.

3. The switch of claim 1, wherein the switch is configured to support unicast and multicast communication between the plurality of nodes and the switch.

4. The switch of claim 1, wherein a response to the request to acquire the mutex is multicast in a response packet transmitted to the plurality of nodes.

5. The switch of claim 1, wherein a node to send a query message to check if the object is locked and if the object is locked to obtain lease information to identify when the object is scheduled for release.

6. The switch of claim 1, wherein the request to acquire a mutex for an object includes a type of access for the object.

7. The switch of claim 6, wherein the type of access for the object is read-only, write-only, read-write, or read-modify-write.

8. A data center comprising:
a plurality of nodes, each node including a network interface controller; and
a switch, the switch comprising:
an intercept controller to receive a packet from one of the plurality of nodes, the packet to include a request to acquire a mutex for a resource shared by two or more of the plurality of nodes; and
a mutex controller to process the request for the mutex for the resource forwarded from the intercept controller, the mutex controller to provide access to the resource to the one of the plurality of nodes if the mutex for the resource is not being used and to reject the request to acquire the mutex for the resource if the mutex for the resource is being used;
wherein:
the request is associated with at least one tenant of multiple tenants;
the resource is comprised in resources to be partitioned based at least in part upon security sensitivity rat-ings;
the security sensitivity ratings are associated with respective key data; and
tenant access to the resources is to be based at least in part upon the respective key data.

9. The data center of claim 8, wherein the switch is a top of rack switch or a spine switch.

10. The data center of claim 8, wherein the resource is an object, a data block, or a network resource.

11. The data center of claim 8, wherein the packet includes a web Application Program Interface that includes the request for the mutex for the resource.

12. The data center of claim 8, wherein the switch is configured to support unicast and multicast communication between the plurality of nodes and the switch.

13. The data center of claim 8, wherein a response to the request to acquire the mutex is multicast in a response packet transmitted to the plurality of nodes.

14. The data center of claim 8, wherein a node to send a query message to check if the resource is locked and if the resource is locked to obtain lease information to identify when the resource is scheduled for release.

15. One or more non-transitory machine-readable storage media comprising a plurality of instructions stored thereon that, when executed, cause a system to perform operations comprising:
receive a packet from one of a plurality of nodes, the packet to include a request to acquire a mutex for an object shared by two or more of the plurality of nodes; and
process the request to acquire the mutex for the object to provide access to the object to the one of the plurality of nodes if the mutex for the object is not being used and to reject the request to acquire the mutex for the object if the mutex for the object is being used;
wherein:
the request is associated with at least one tenant of multiple tenants;
the object is comprised in resources to be partitioned based at least in part upon security sensitivity rat-ings;

the security sensitivity ratings are associated with respective key data; and tenant access to the resources is to be based at least in part upon the respective key data.

16. The one or more non-transitory machine-readable storage media of claim 15, wherein the packet includes a web Application Program Interface that includes the request for the mutex for the object.

17. The one or more non-transitory machine-readable storage media of claim 15, wherein the system is configured to support unicast and multicast communication between the plurality of nodes and the system.

18. The one or more non-transitory machine-readable storage media of claim 15, wherein a response to the request to acquire the mutex is multicast in a response packet transmitted to the plurality of nodes.

19. The one or more non-transitory machine-readable storage media of claim 15, wherein a node to send a query message to check if the object is locked and if the object is locked to obtain lease information to identify when the object is scheduled for release.

20. The one or more non-transitory machine-readable storage media of claim 15, wherein the request to acquire a mutex for an object includes a type of access for the object.

21. The one or more non-transitory machine-readable storage media of claim 20, wherein the type of access for the object is read-only, write-only, read-write or read-modify-write.

\* \* \* \* \*